H. J. SAUVAGE.
BOX MAKING MACHINE.
APPLICATION FILED AUG. 6, 1920.
1,376,361.
Patented Apr. 26, 1921.
17 SHEETS—SHEET 11.
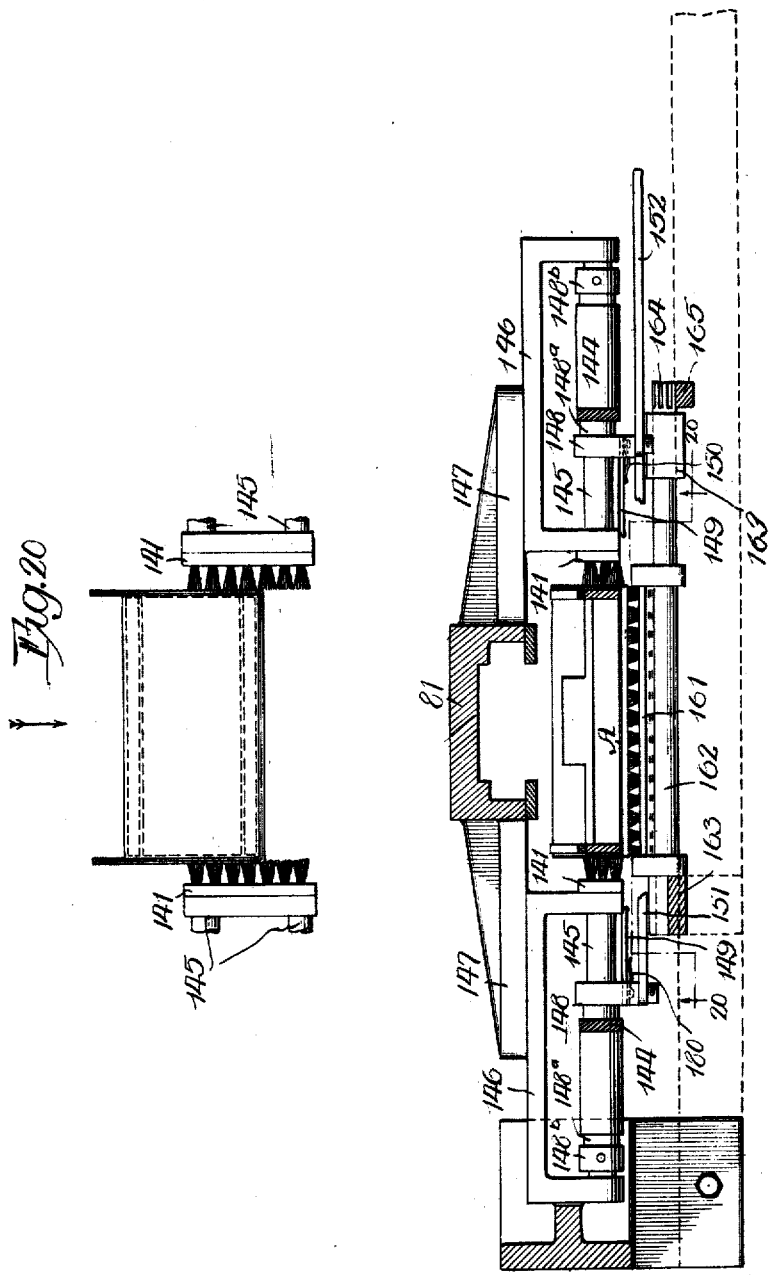
INVENTOR.
Herbert J. Sauvage
BY
ATTORNEYS

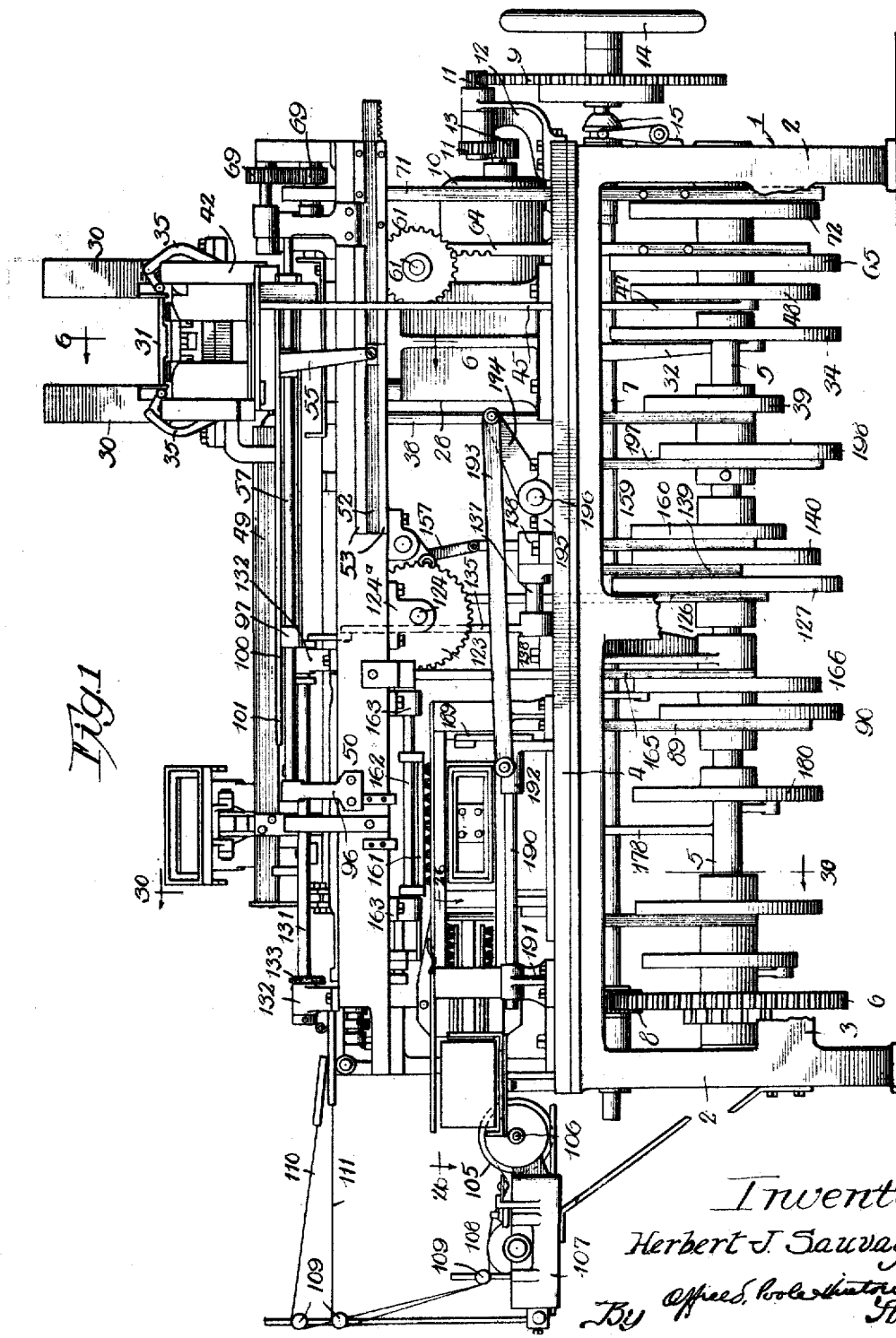

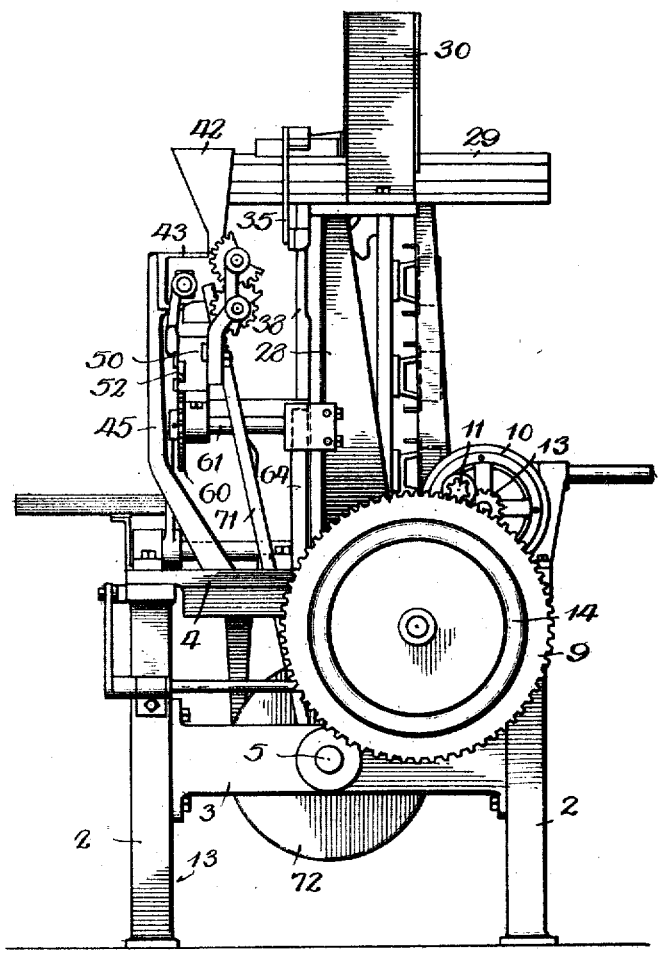

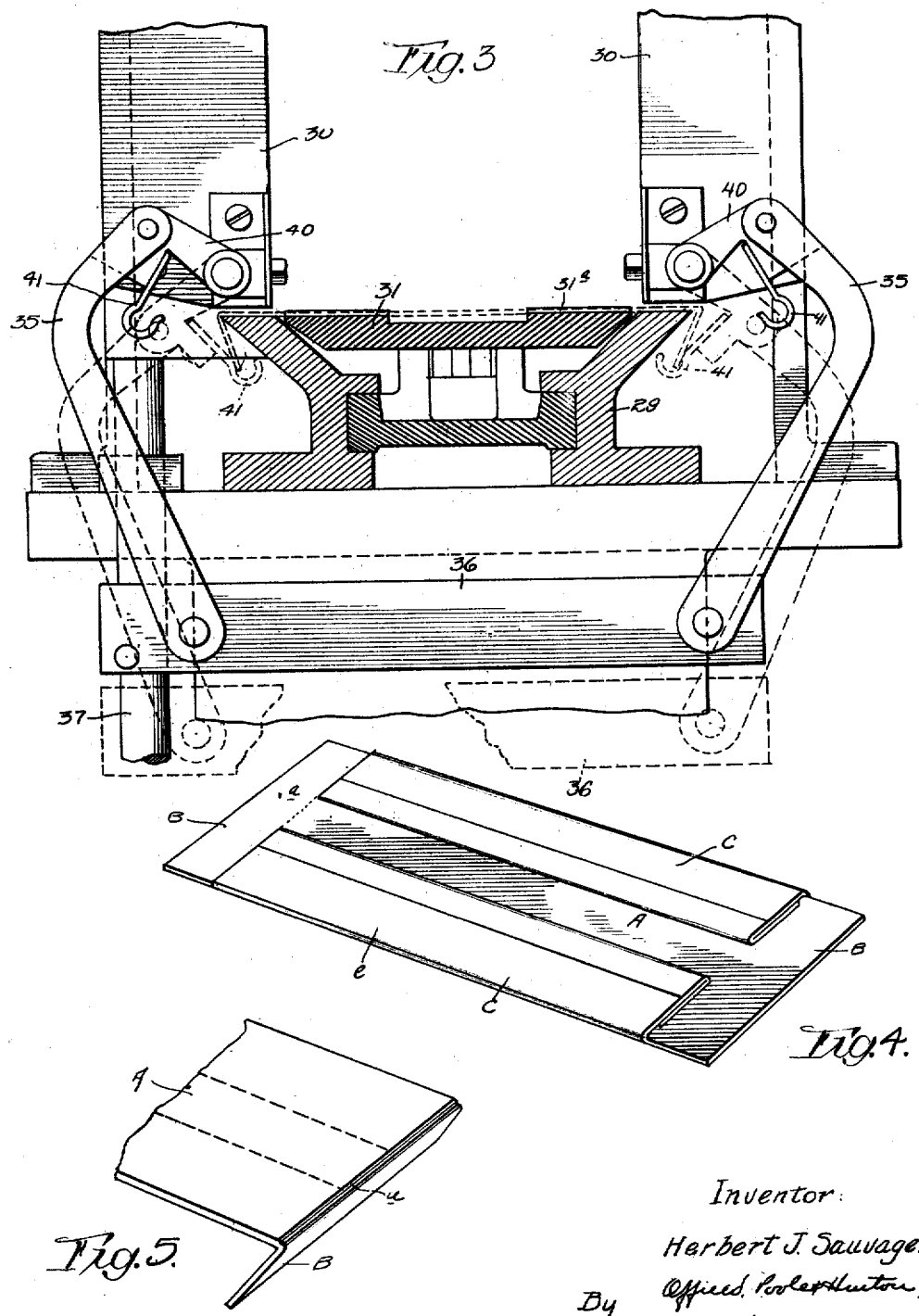

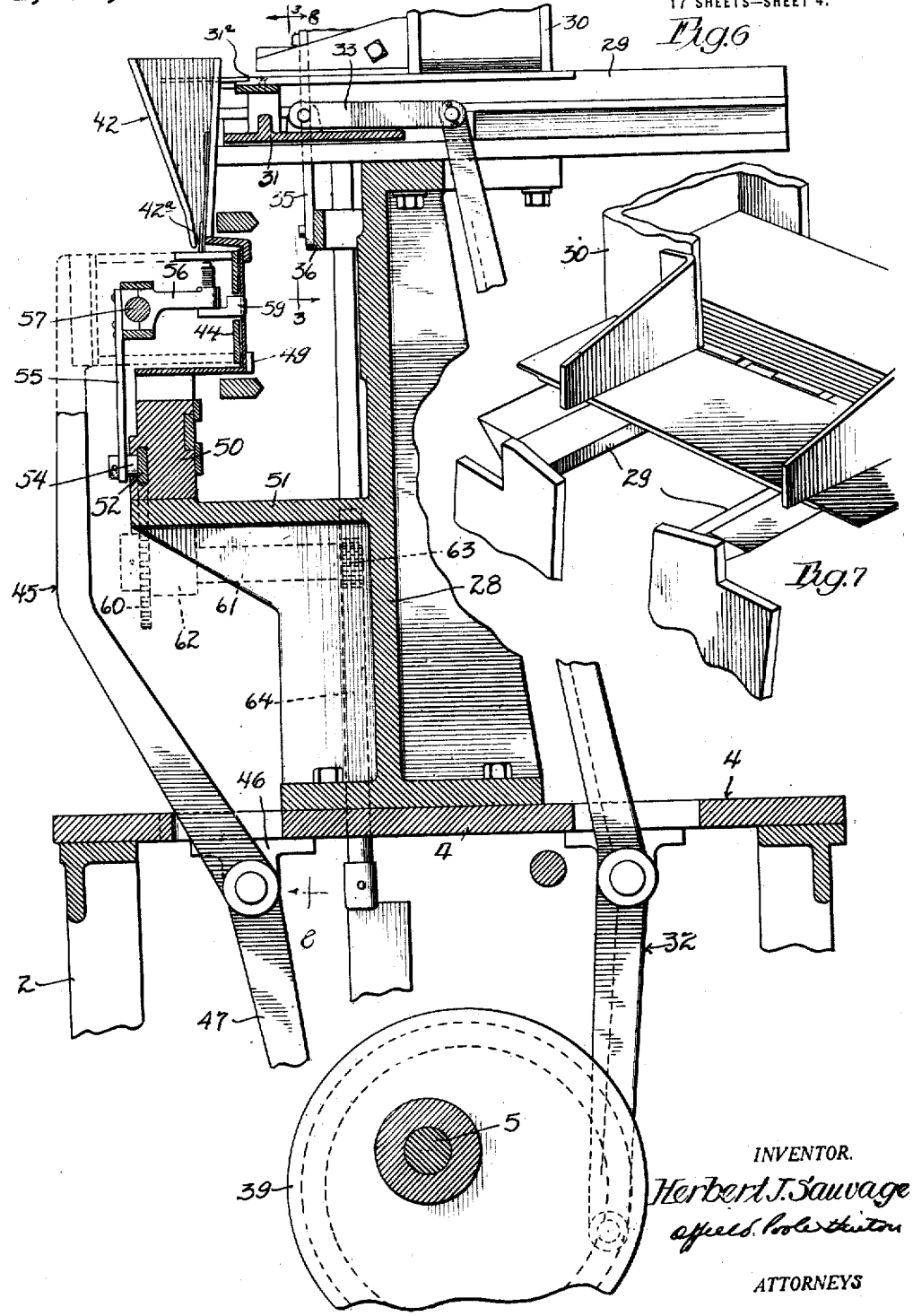

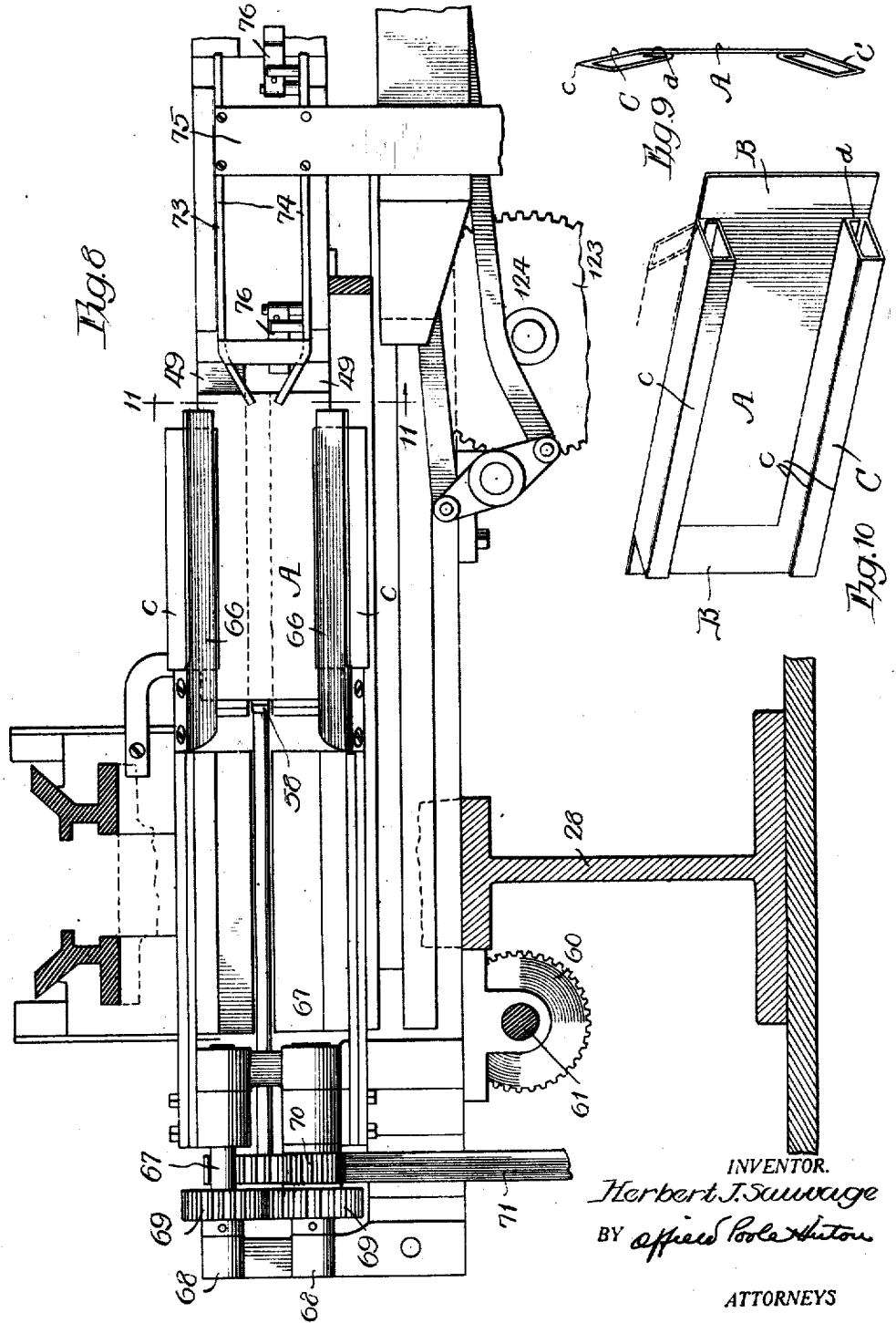

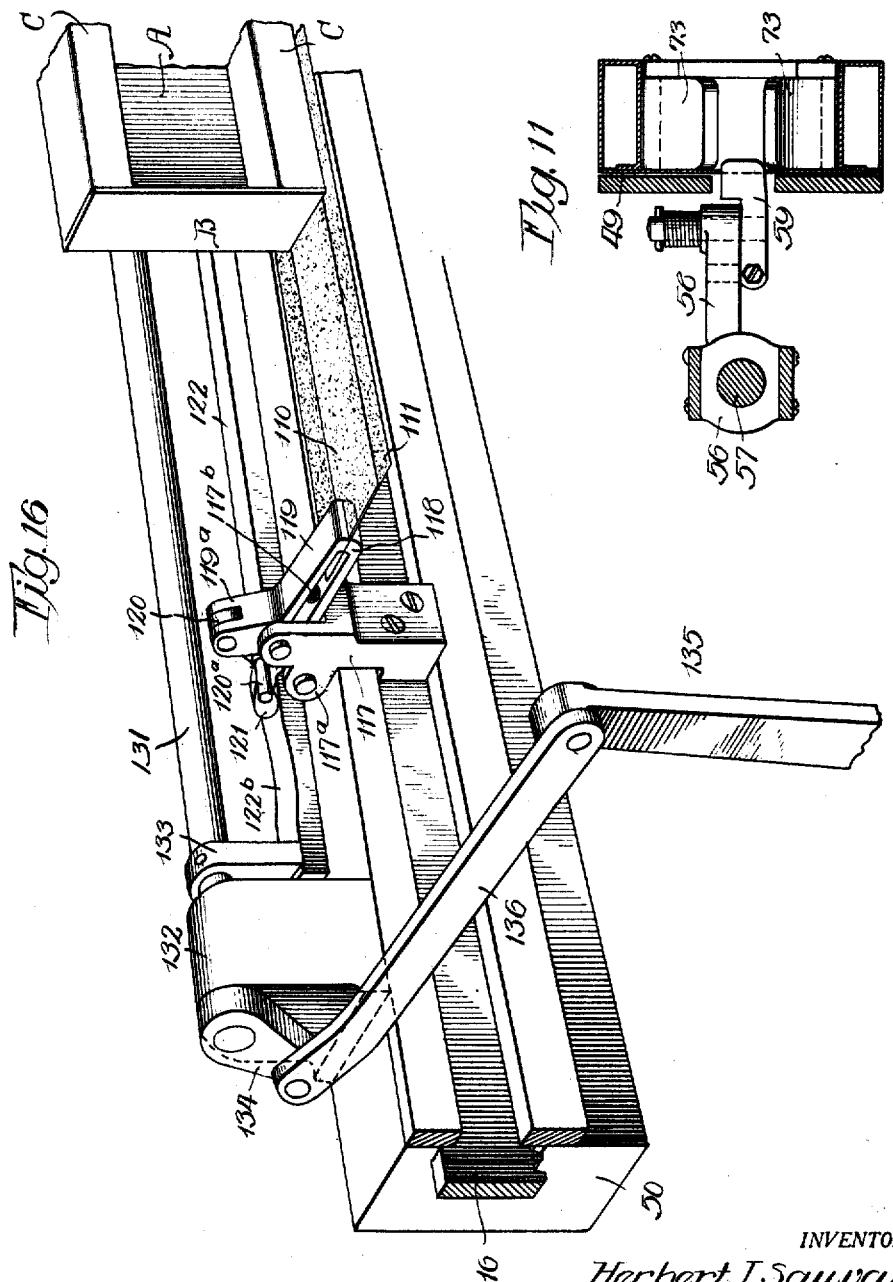

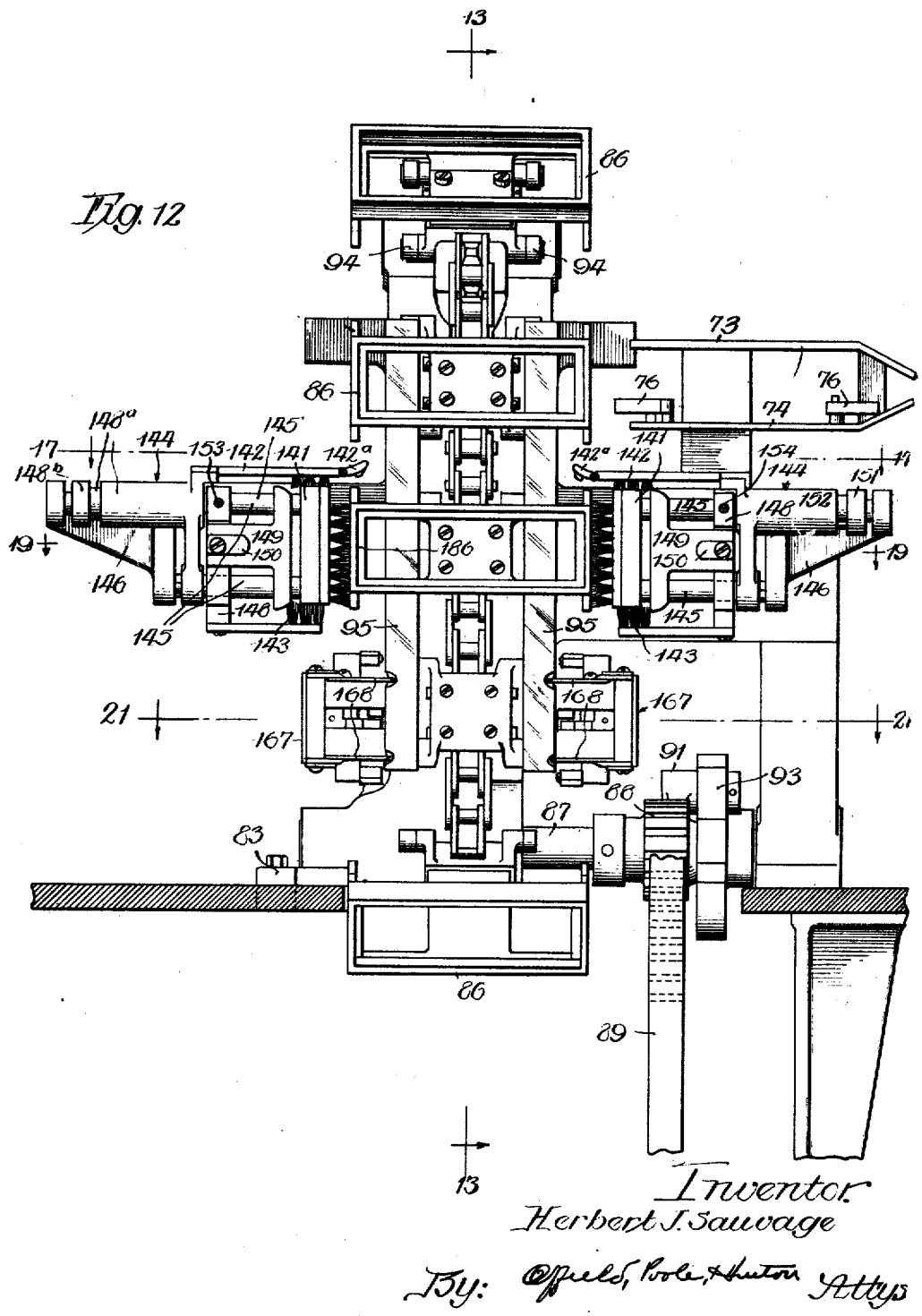

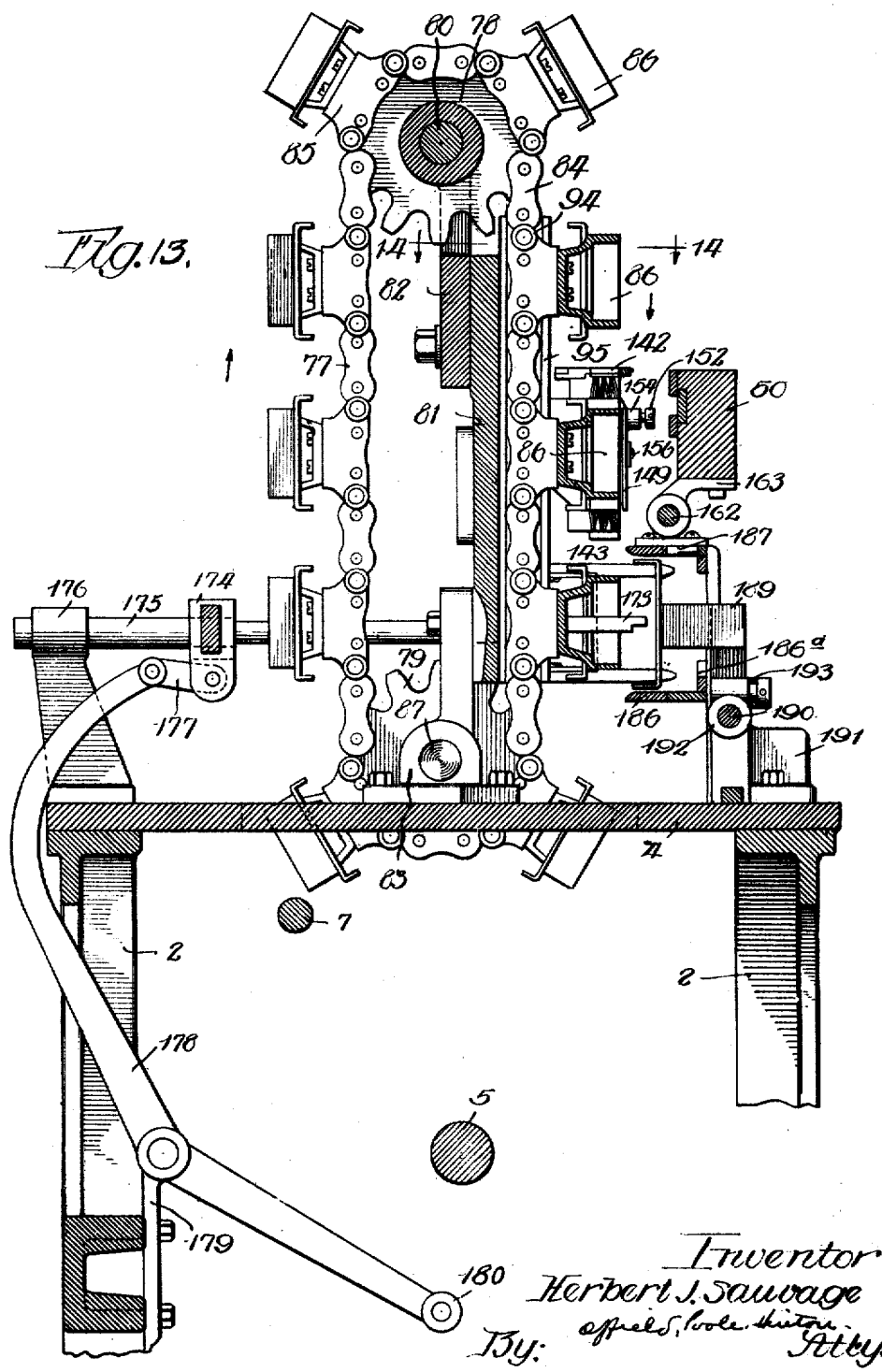

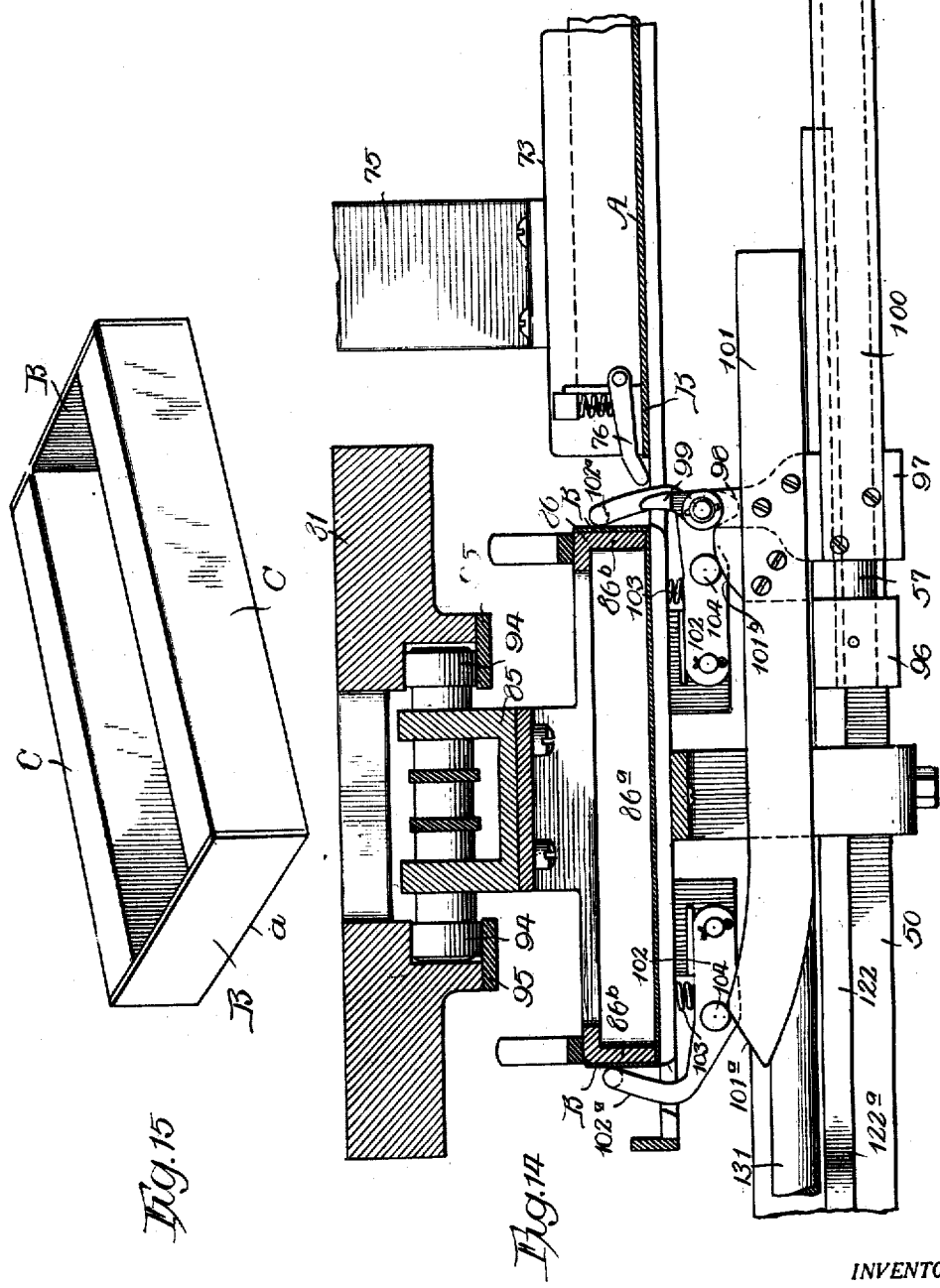

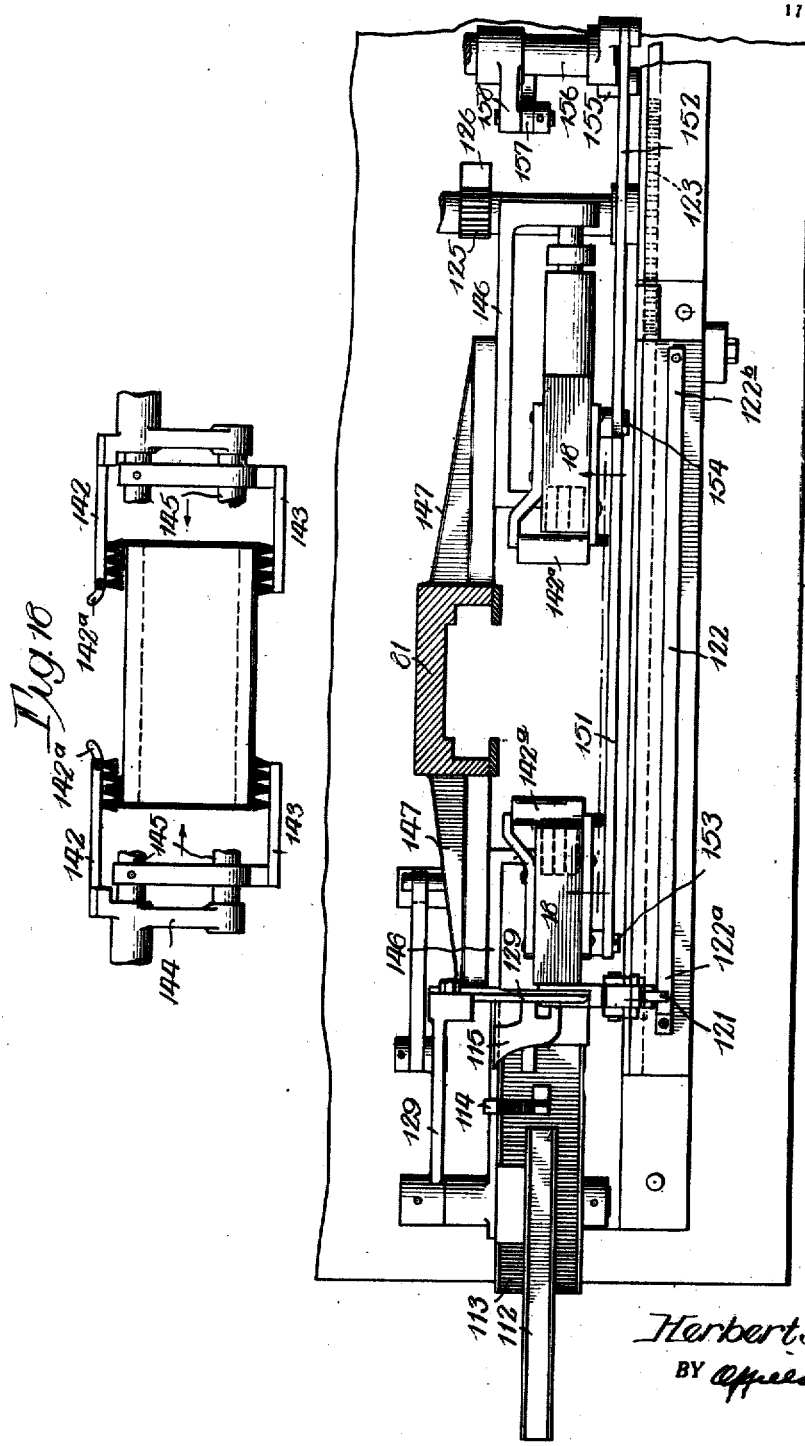

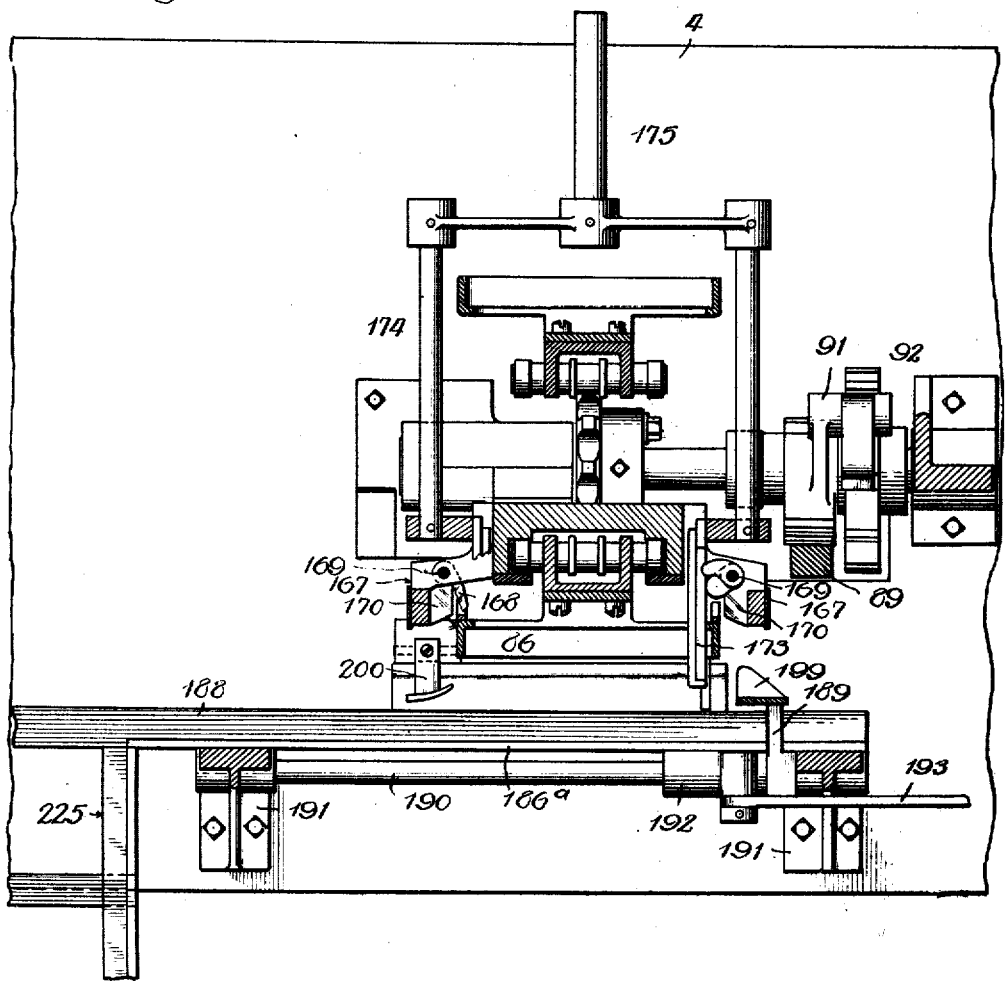
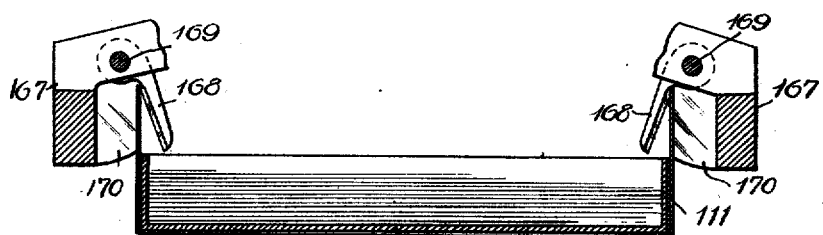

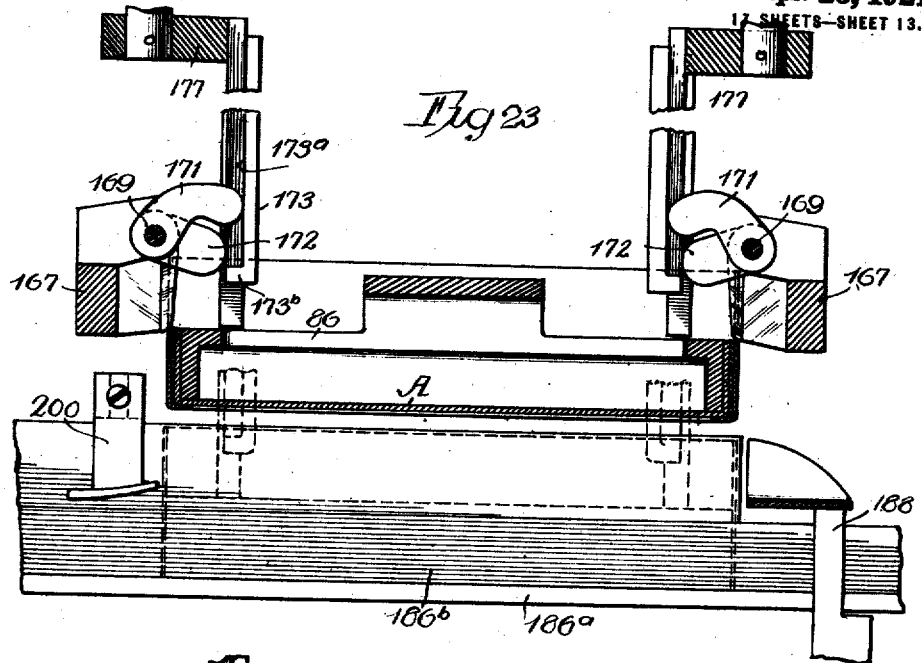
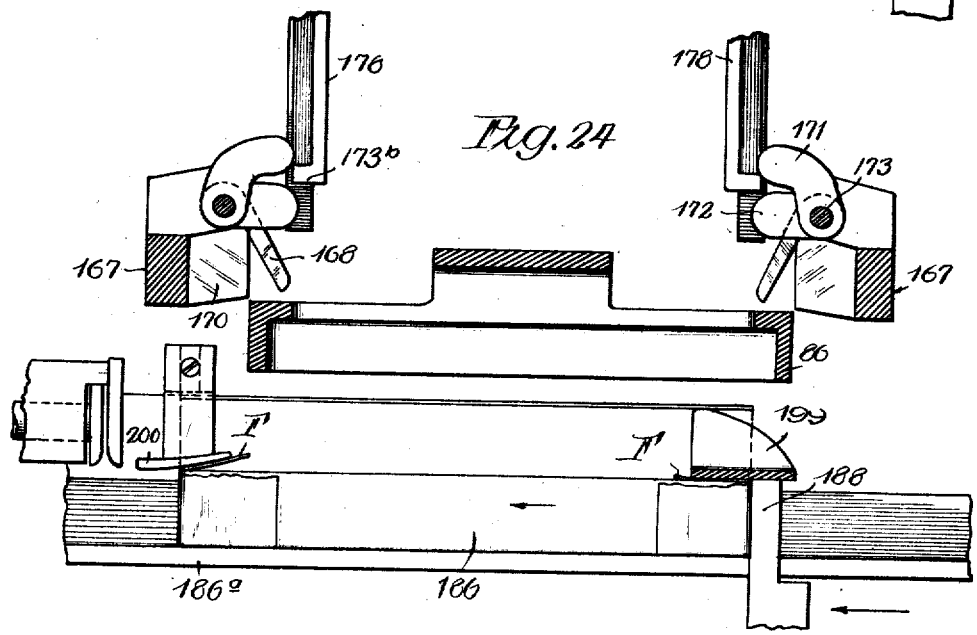

H. J. SAUVAGE.
BOX MAKING MACHINE.
APPLICATION FILED AUG. 6, 1920.
1,376,361.
Patented Apr. 26, 1921.
17 SHEETS—SHEET 14.
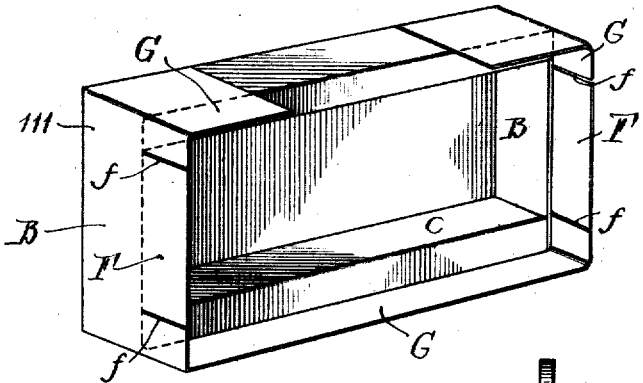
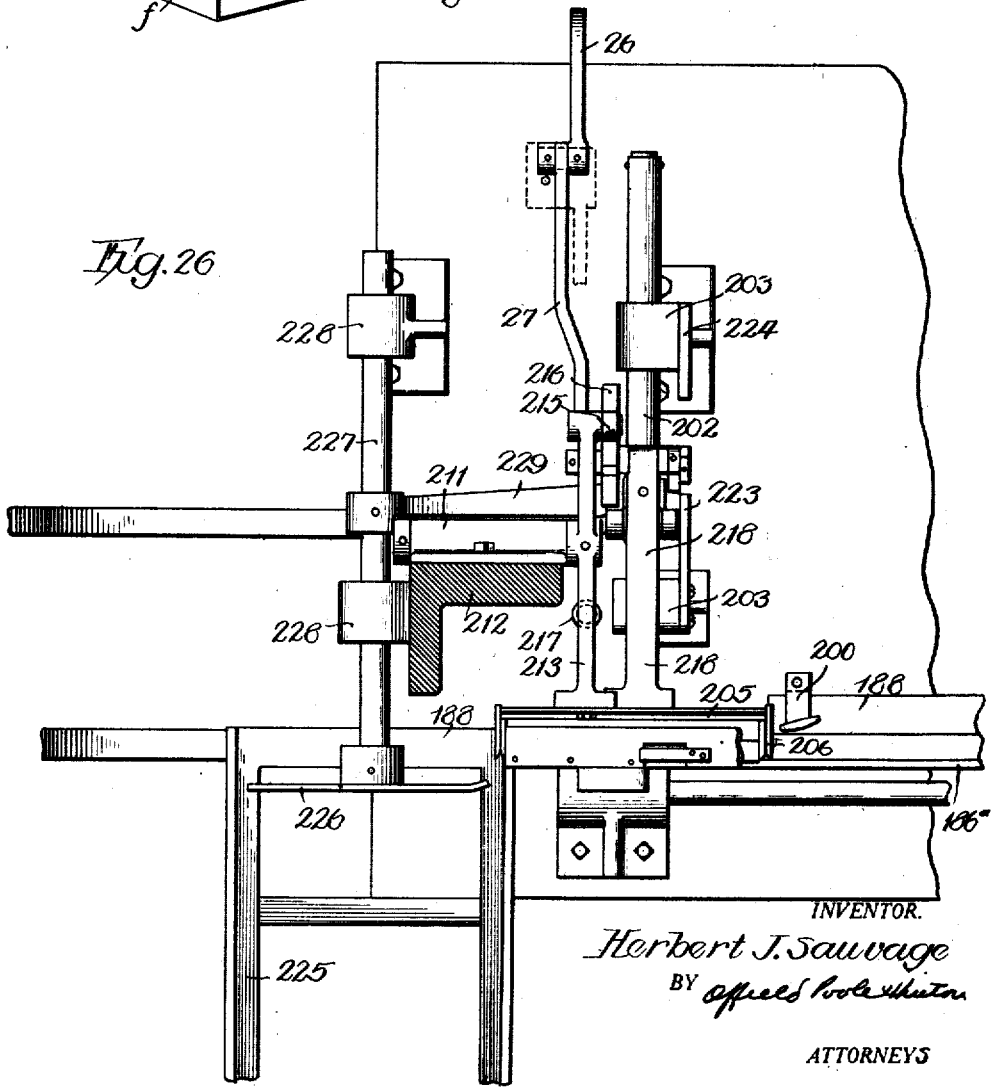
INVENTOR.
Herbert J. Sauvage
BY
ATTORNEYS H. J. SAUVAGE.
BOX MAKING MACHINE.
APPLICATION FILED AUG. 6, 1920.
1,376,361.
Patented Apr. 26, 1921.
17 SHEETS—SHEET 15.
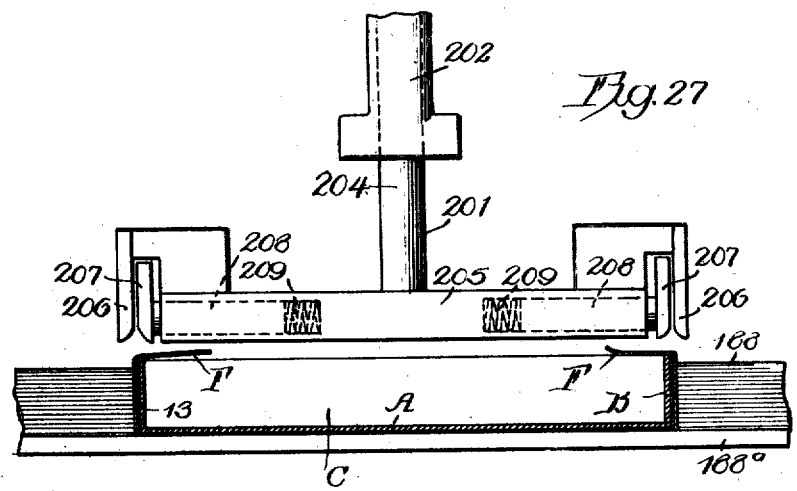
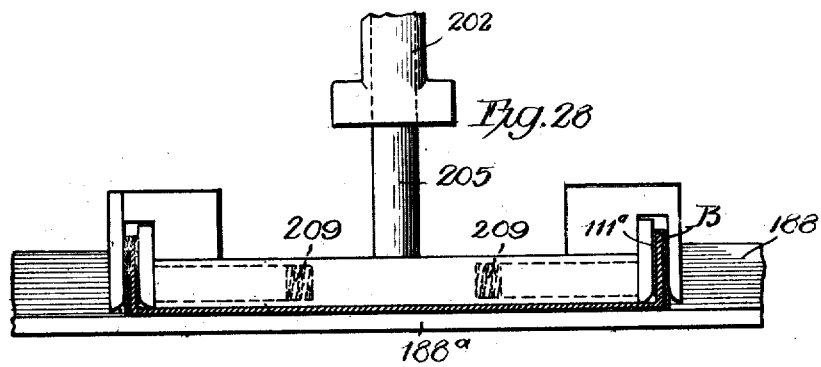
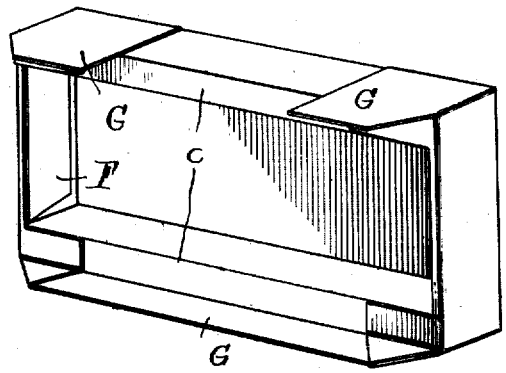
INVENTOR.
Herbert J. Sauvage
BY
ATTORNEYS

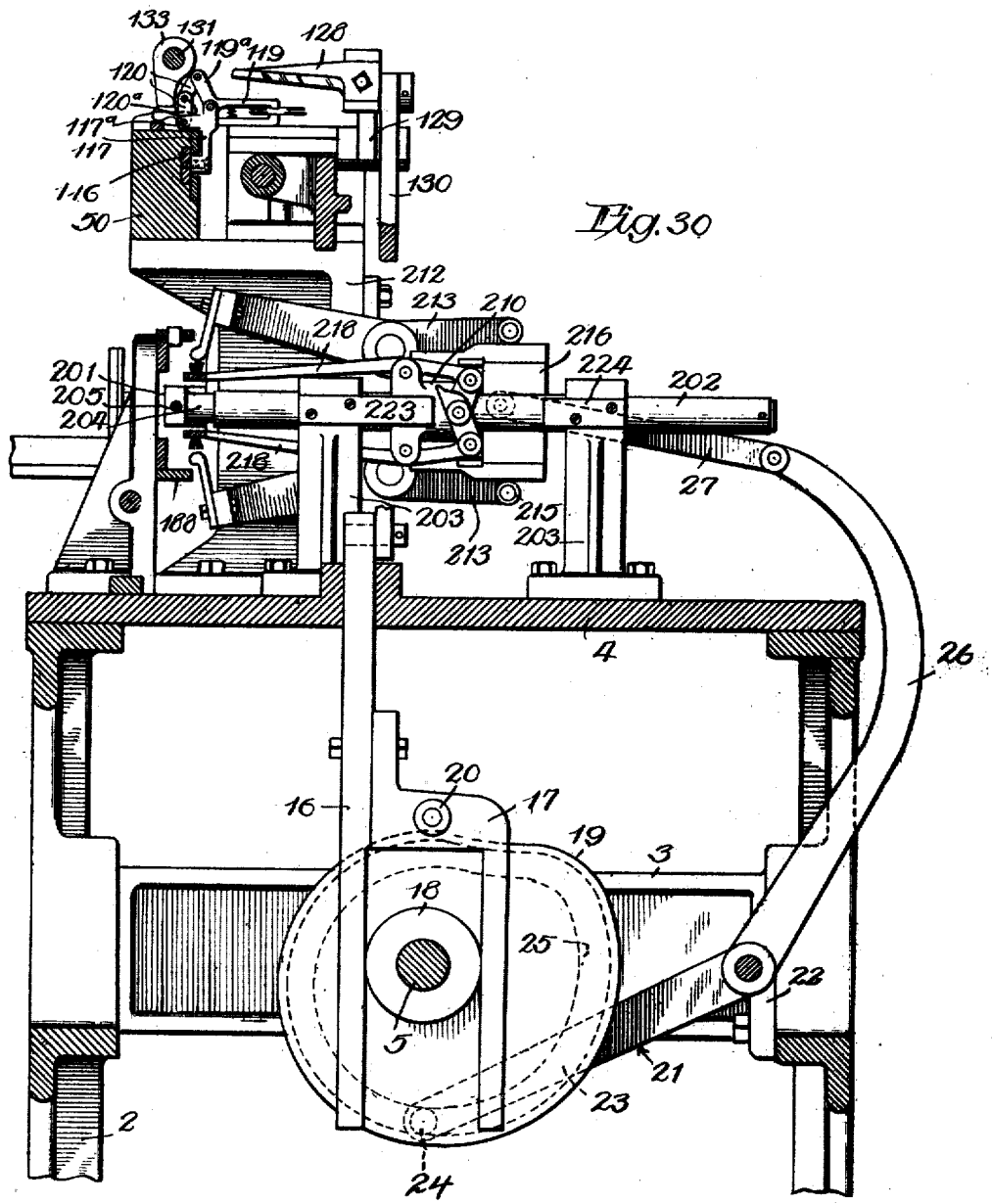

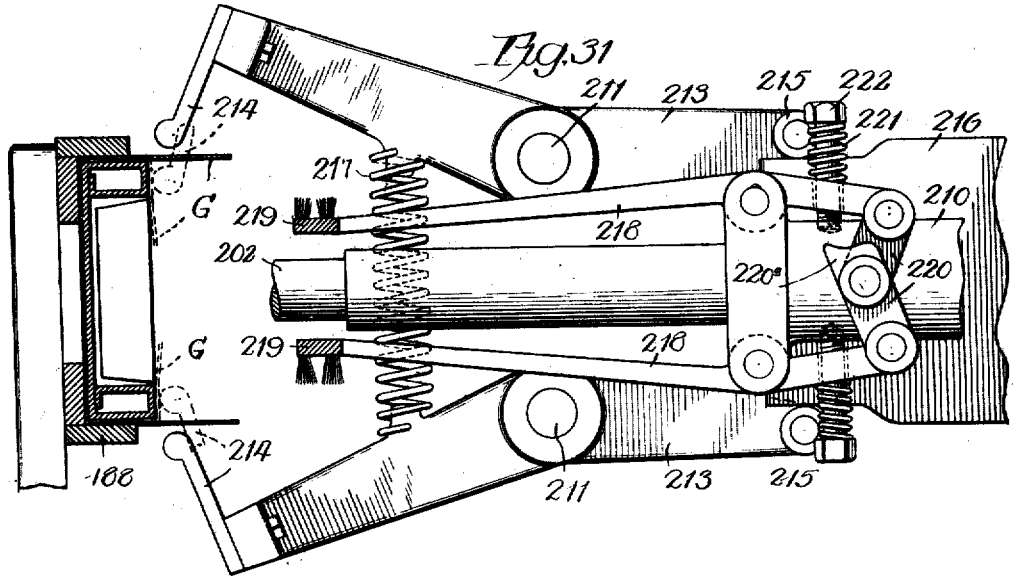
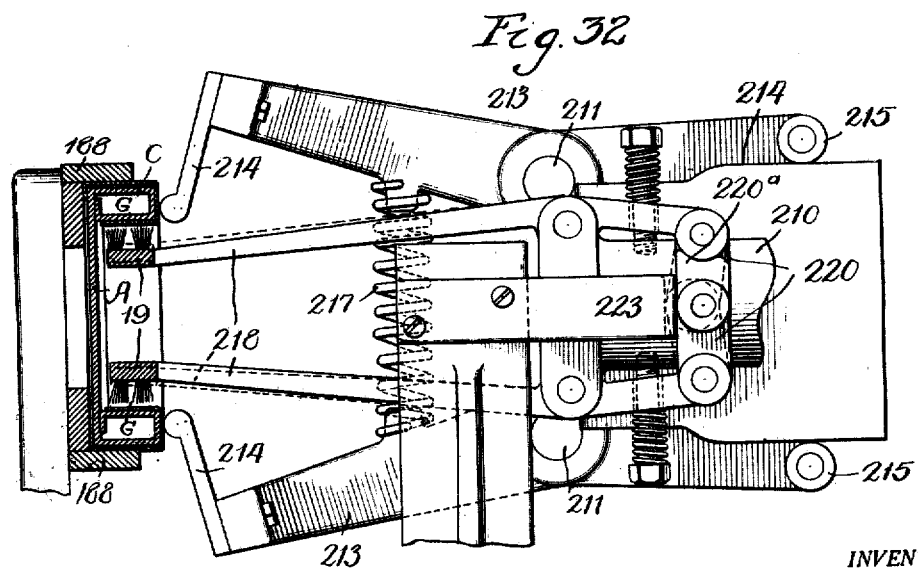

UNITED STATES PATENT OFFICE.

HERBERT J. SAUVAGE, OF CHICAGO, ILLINOIS, ASSIGNOR TO A. D. SHOUP COMPANY, OF CHICAGO, ILLINOIS, A CORPORATION OF ILLINOIS.

BOX-MAKING MACHINE.

1,376,361.  Specification of Letters Patent.  Patented Apr. 26, 1921.

Application filed August 6, 1920. Serial No. 401,732.

*To all whom it may concern:*

Be it known that I, HERBERT J. SAUVAGE, a citizen of the United States, and a resident of Chicago, in the county of Cook and State of Illinois, have invented certain new and useful Improvements in Box-Making Machines, of which the following is a specification.

This invention relates to improvements in box making machines, and more particularly to a machine adapted for use in carrying out a definite operation in the manufacture of a completed box, to-wit: the forming of a blank, properly cut and scored along the fold lines into box-like form, applying a reinforcing strip around the sides of the box, and covering the sides, surrounding margins, and portions of the inside surface of the box with a coating or covering of paper, such as will provide a suitable finish in the appearance of the box.

The machine hereinafter fully described and illustrated as a preferable embodiment of the invention is more especially designed to be used in the manufacture of the body or containing portions of the boxes or cartons ordinarily used in the packing of packages of chewing-gum for display purposes. These boxes or cartons are ordinarily of oblong shape, rather shallow in depth, and preferably having a double or hollow wall construction throughout the longer side walls of the box, this type of box being preferred by manufacturers of chewing-gum for the reason that the contents are better preserved and protected in shipment and provides a more attractive and suitable container for display purposes. The complete box is provided with a hinged lid or cover, although it is to be understood that the machine of the present invention operates only on the body of the box, preparing that part of the box for the addition of the hinged cover and the application of the desired labels bearing the lithographic matter pertaining to the nature and origin of the goods.

The object of this invention is to provide a construction for a machine which will rapidly and efficiently accomplish the several operations in the manufacture of the completed box for which it is designed, and to thereby replace hand labor heretofore employed in carrying out the same operations. A further object of the invention is to provide a machine which will not only accomplish those operations heretofore carried out by hand, but to arrange and design the moving parts of the machine with such degree of accuracy and precise coöperation as to insure the necessary sequence of operations to follow each other accurately in point of time, that a box may be continuously advanced through the machine and operated upon without the assistance of human agencies. Not only is it proposed that the several operations will follow one another with certain sequence, but that two or more operations may be carried on simultaneously without interference or confusion.

The preferred construction of the machine embodying the invention is hereinafter fully set forth and completely illustrated in the accompanying drawings, wherein—

Figure 1 is a front view of the complete machine showing the general arrangement and relation of the different parts;

Fig. 2 is a view in end elevation of the machine;

Fig. 3 is an enlarged detail view taken on line 3, 3 of Fig. 6, showing the feed hopper and the score line breaking device;

Fig. 4 is a perspective view of one of the blanks as fed to the machine;

Fig. 5 is a fragmentary view of one end of the blank, showing the manner in which the score lines are broken;

Fig. 6 is an enlarged cross-sectional view taken on line 6, 6 of Fig. 1;

Fig. 7 is a perspective view of the feed hopper and feeding device, and showing a number of blanks in the hopper;

Fig. 8 is a view in rear elevation with parts in section as taken on line 8, 8, of Fig. 6, showing the score line breaking knives and parts adjacent thereto;

Fig. 9 is a cross-sectional view of a blank showing the manner in which the hollow side walls are spread outwardly by the score line breaking knives;

Fig. 10 is a perspective view of a blank showing the hollow side walls extended and the blank in the form in which it is fed to the carrier;

Fig. 11 is a detail view in cross-section taken on line 11, 11 of Fig. 8;

Fig. 12 is an enlarged view in front elevation of the endless carrier, its actuating mechanism, and devices associated therewith;

Fig. 13 is an enlarged view in vertical section, taken on line 13, 13, of Fig. 12, showing the carrier in side elevation and adjacent parts in cross-section;

Fig. 14 is an enlarged detail view in cross-section, taken on line 14, 14 of Fig. 13, showing one of the arbors with a folded blank applied thereto immediately after the end walls have been folded against the arbors;

Fig. 15 is a perspective view of a blank completely folded and ready to receive the coating of paper;

Fig. 16 is an enlarged view in perspective showing the reciprocating gripper and the manner in which the strip of adhesive paper is drawn beneath a folded blank;

Fig. 17 is a view in horizontal section, taken on line 17, 17 of Fig. 12;

Fig. 18 is a view in front elevation, taken on line 18, 18 of Fig. 17, showing the brush wipers in advanced position;

Fig. 19 is a detail view in horizontal section taken on line 19, 19 of Fig. 12;

Fig. 20 is a detail view in front elevation as taken on line 20, 20 of Fig. 19, showing a folded blank being carried downwardly between the stationary brush wipers and showing the strip of paper applied to the blank;

Fig. 21 is a view in horizontal section, taken on line 21, 21 of Fig. 12;

Fig. 22 is an enlarged detail view in horizontal section, showing the relative position of the folded blank and the cutting knives immediately before the cutting operation, the blank being removed from the arbor;

Fig. 23 is an enlarged view of a portion of Fig. 21, showing the relative positions of the blank, the cutting knives, and the pusher bars immediately after the knives have been actuated and the blank about to be removed from the arbor;

Fig. 24 is a similar view showing the relative position of the parts immediately after the blank has been removed from the arbor and the pusher bars withdrawn; also shows the box at the commencement of its movement laterally in the direction of the arrow, and showing the manner in which the end marginal portions of the covering paper are folded inwardly over the edges of the box;

Fig. 25 is a view in perspective of the folded blank with covering strip applied, showing the manner in which the end marginal portions of the covering strip are cut and the state of the box when removed from the arbor;

Fig. 26 is an enlarged detail view in horizontal section, taken on line 26, 26 of Fig. 1;

Fig. 27 is an enlarged detail plan view of the end wall sealing mechanism, showing a box in section immediately in front of the sealing mechanism and in position to be operated upon;

Fig. 28 is a similar view showing the sealing mechanism advanced within the box and illustrating the manner in which the end walls of the box are gripped thereby and the sealing effected;

Fig. 29 is a view in perspective of a box immediately after the end margins of the cover strip are folded inwardly and sealed against the inner surface of the end walls;

Fig. 30 is a view in vertical section, taken on line 30, 30 of Fig. 1; showing the sealing mechanism for folding the side marginal flaps of the covering strip inwardly and downwardly against the inner surface of the side walls, the operating mechanism therefor, and the knife for cutting the strips of the covering paper;

Fig. 31 is an enlarged detail view in side elevation of the side flap folding and sealing mechanism at the commencement of its operation upon the box, and shown in cross-section; and Fig. 32 is a similar view of the folding and sealing mechanism after the completion of the sealing operation and immediately before the same is removed from the box.

Referring in a more general way to the machine, the different operations accomplished by the machine and the form of box or container and the material applied to the box, it is to be understood that a number of blanks are fed to the machine, each blank being removed from a feed hopper and advanced step by step through the machine, the said blank coming to rest at each step, and during the period of rest one or more operations are accomplished, although in some instances, a definite operation is accomplished during the movement of the blank from one position or step to another.

The blank for which the machine herein illustrated is particularly designed to operate upon, comprises a rectangular bottom wall A, end walls B, of a single thickness of material, separated from the bottom wall A by means of score lines $a$, and side walls C of the double or hollow wall structure hereinbefore indicated. These hollow side walls are preferably formed by folding the side marginal portions of the blank along parallel score lines $c$, there being formed a marginal flap $d$. When the hollow sides are folded there are formed two spaced walls $e$, $e$, a connecting top wall $f$ parallel with the bottom wall A of the blank, the end flap $d$ being glued or otherwise secured to the bottom wall A of the blank. The blank is fed to the machine in knock-down form, that is, the end walls extend outwardly in the plane of the bottom wall and the hollow side walls C are folded inwardly toward each other and against the bottom wall A so that the blank is substantially flattened out, as shown in Fig. 4.

The first major operation to be accomplished is that of forming or folding the blank into its final shape to receive the covering layer of paper, and the second major operation to be accomplished is that of applying the paper having previously received a coating of glue, or other suitable adhesive, to the folded blank. The first major operation may be termed the preparatory operation, and includes a number of successive operations which may be described as those operations which bend or break the blank along the score lines, thereby enabling the forming of the blank into box form to be accomplished more readily, and then the actual folding of the blank into box-like form. The second major operation likewise consists of numerous subordinate operations by which the blank is applied to an arbor carried on an endless carrier and advanced through several positions, during which a strip of gummed paper is applied to the sides of the box and pressure applied to insure proper adhesion and smooth finish by means of brushes or wipers, the overlapping edges of the paper folded against the bottom wall of the box, the overlapping margins of the paper surrounding the upper edges of the box are cut, folded inwardly and downwardly against the inside surface of the box and properly secured by means of brush wipers, and finally discharged from the machine. To accomplish all of these various steps and operations, a multitude of reciprocating, oscillating, and rocking members are employed, all of these members being driven from a single source of power, such as a motor, the motor having driving connection with the main driving shaft upon which are mounted properly designed cam members which transmit to the parts which actually engage the blanks, the proper movement and at the proper time. The blank engaging parts are connected to their respective cams by means of intermediate links and levers, although in many instances two or more blank engaging parts are operated by a single cam. These cams are designed to produce the desired motion and are likewise coördinated with respect to each other as to operate their blank engaging members at the proper instant. For the most part, these cam members produce an intermittent motion inasmuch as the members operated thereby operate on each of the blanks as they are successively advanced through the machine.

Considering those parts which enter into the construction of the machine, although not forming the vital operative parts thereof, a frame 1 having the form of a table having legs 2 and cross members 3 supports on its top surface a foundation plate 4 upon which are bolted or otherwise secured other frame members which carry the various operating elements.

Journaled in bearings formed at opposite ends of the table and below the top surface thereof is a shaft 5 provided at one end with a large gear wheel 6. Above the shaft 5 and extending parallel with it is a drive shaft 7 having a pinion 8 meshing with the gear wheel 6 of the driven shaft 5. At the opposite end of the driving shaft 7 and beyond the end of the frame 1 is a large gear wheel 9 to which power is transmitted by means of a motor 10 suitably mounted upon the foundation plate or bed 4, said motor being operatively connected with the gear wheel 9 through the medium of a train of gear wheels 11, 11 mounted on a shaft journaled in a bearing bracket 12 and meshing with the gear wheel 9 and the pinion 13 keyed to the armature shaft of the motor. At the extreme end of the driving shaft 7 is a hand wheel 14. Preferably mounted between the gear wheel 9 and the driving shaft 7 proper, is provided a clutch 15 of any suitable construction and operative by means of a lever (not shown) within reach of the operator to enable the machine to be stopped without stopping the motor.

Upon the driven shaft 5 are keyed a series of cam plates, generally of circular form, though varying in size and conformation, and likewise varying in their angular relation in order to produce the desired motion at the proper time. These cam wheels are designed to produce in general two types of movement, namely, a vertical reciprocating movement and a horizontal reciprocating movement. Referring to Fig. 30, there is illustrated the two types of drive employed in the machine, a description of which will suffice for all of the several cam wheels. Where it is desired to provide a vertical reciprocatory motion, a vertical bar 16 is provided at its lower end with an L-shaped member 17 which forms a vertical slot straddling the hub 18 of a cam wheel 19 keyed to the driven shaft 5. The periphery of the cam wheel 19 is irregular in contour and designed to transmit to the bar 16 an intermittent reciprocatory movement, said bar being provided with a cam roller 20 journaled on the L-member 17. Where a horizontal reciprocatory movement is desired, a bell crank lever 21 is employed, the same being journaled upon a suitable bearing 22 fixed to the table frame 1 at a point rearwardly of the shaft 5. At the end of the lower arm 23 of the lever 21 is a cam roller 24 engaging a cam groove 25 formed in the cam wheel 19, and the upper arm 26 extends upwardly above the foundation plate 4 and is connected to the horizontally reciprocating parts operated thereby, by means of an intermediate link 27. Although the driving mechanisms just described are associated with separate operating members, it is to be understood that the description applies to all of the several cam wheels, bars and rocking levers and therefore each individual cam wheel and part driven thereby need not be described in detail other than to point out the particular cam wheel and bar referred to and the nature of the motion transmitted. In general, it may be stated that the vertically reciprocating bars are provided with racks at their upper ends which mesh with gear wheels, whereas the rocking levers are usually connected to the parts actuated thereby through the medium of links.

Referring more in detail to the more essential parts of the machine, and considering these parts in the order in which they operate upon a blank in its passage through the machine, the blank feeding mechanism will first be described, these parts being located at the right end of the machine as it appears in Fig. 1.

The blank feeding mechanism, as well as other parts of the machine, are supported upon a vertical standard 28, Fig. 6, bolted at its base to the foundation plate 4. At the top of the standard 28 is secured the blank feeding mechanism, comprising parts as follows: A blank feeding mechanism consists of a hopper having a base plate 29, Fig. 3, having somewhat the shape of a Y in cross-section, said base plate being rigidly mounted upon the top of the standard 28. Extending upwardly from the base plate 29 are vertically arranged channel members 30, 30 opening toward each other, and adapted to receive a number of blanks, folded in the form shown in Fig. 4, with the inwardly folded side walls C facing downwardly, as clearly shown in Fig. 7. Slidably mounted between the outwardly inclined members of the base plate 29 is a horizontally reciprocating feed plate 31 which forms in effect the bottom of the feed hopper and is adapted to be actuated through the medium of a rock shaft 32 connected to said feed plate by means of a link 33 and at its lower end with a cam plate 34 mounted on the driven shaft 5. Extending along the forward edge of the feed plate 31 is a shoulder 31ª of sufficient depth to grip the lowermost blank in the feed hopper and advance it in a forward direction, as illustrated in Fig. 6, it being understood that the feed plate reciprocates, constantly feeding forward a blank at each stroke in a forward direction.

As clearly shown in Fig. 3, the lowermost blank, represented in dotted lines as engaging the shoulder 31ª of the feed plate, extends lengthwise beyond the lateral edges of the base plate 29. Arranged in the path of movement of the blank as it is advanced forward from the feed hopper is provided a mechanism consisting of two L-shaped links 35, 35 located on opposite sides of the base plate 29 and arranged in vertical position. The lower ends of the links 35, 35 are connected to a horizontal bar 36 slidably mounted upon a vertical guide rod 37. The bar 36 is rigidly connected to a vertical bar 38 extending downwardly to the driven shaft 5 and operatively connected to the cam wheel 39 designed to transmit an intermittent reciprocatory motion to the bar 38. Referring again to the links 35, 35, Fig. 3, the upper ends thereof are pivotally connected to short links 40, 40, journaled at their free ends to the channel members 30, 30 of the feed hopper. Fixed to each of the short links 40, 40 is a downwardly depending plate 41 having inwardly opening hooked extremities. As each blank is advanced forwardly from the feed hopper the end margins pass within the hooked extremities of the plates 41, 41 and as the blank momentarily comes to rest, the link members are actuated in a downward direction to the position shown in dotted lines, the end walls B of the blank being bent downwardly, thus breaking the score lines a, a, as shown in Figs. 3 and 5. In this manner the end walls B are rendered more flexible and capable of being formed in their ultimate positions during subsequent operations.

Immediately in front of the feed hopper and adjacent the forward end of the path of movement of the feed plate 31, is a vertical chute 42 having a vertical rear wall and a sloping front wall converging at the bottom of the chute in a narrow slot 42ª. Immediately below the slot 42ª of the chute 42 is a horizontally reciprocating actuating member comprising a horizontal plate 43 spaced a short distance below the chute 42 and a vertical plate 44 abutting against the inner edge of the plate 43. The plates 43 and 44 are rigidly connected to a rocking arm 45 extending downwardly through a slot formed in the foundation plate 4 and journaled to the under surface thereof upon a journal blank 46. The lower portion or lever arm 47 of the rocking lever 45 is operatively connected with the cam wheel 48 by the arrangement of cam groove and roller hereinbefore described, said cam plate being designed to transmit through the medium of the rocker arm 45 a forward and rearward reciprocating movement of the plates 43 and 44. Adjacent to the plates 43 and 44 and offset inwardly from the lower extremity of the chute 42 are located horizontal guide plates 49, said plates forming a part of the horizontal track along which the blanks are advanced during subsequent operations thereon, said guide plates being suitably supported upon the stationary frame members, as for instance, the lower guide plate 49 extends horizontally inward from a horizontal beam 50 extending substantially throughout the entire length of the machine and supported upon a horizontal arm 51 integral with the vertical standard 28 and projecting forwardly at right angles thereto. Slidably mounted in the beam 50 and adjacent the outer surface thereof is a rack bar 52, the same being retained between guide rails 53. This rack bar is provided with a pin 54 located substantially midway between its ends, said pin having connected thereto a vertical bar 55 extending upwardly and connecting the rack bar with a sliding block 56 mounted upon a horizontal rod 57. Integral with the sliding block is an arm 58 extending inwardly toward the guide plates 49, 49, and having at its end a spring actuated finger 59. The rack bar 52 is provided with teeth along its lower edge which mesh with a gear wheel 60 mounted upon a shaft 61 journaled in a bearing 62 immediately below the beam 50. At the inner end of the shaft 61 is provided a pinion 63 meshing with the teeth of a vertical rack bar 64 extending downwardly through the foundation plate 4 and having operative connection with the cam wheel 65, said cam wheel and rack bar being designed in a manner hereinbefore set forth to impart rotative movement to the gear wheel 60 in alternately opposite directions, said gear wheel in turn imparting a reciprocating motion to the rack bar 52.

Describing now the operation of the mechanisms which engage the blanks immediately after being advanced by the feed plate 31, each blank as it is advanced forwardly by said feed plate 31 is carried to the position shown in Fig. 6, namely, into the upper portion of the chute 42. At the end of its forward movement the forward edge of the blank drops downwardly by gravity, and comes to rest in a vertical position with its forward edge projecting through the slot 42ᵃ at the lower end of the chute and resting upon the plate 43 of the reciprocating pusher frame operated by the rocker arm 45. In the position shown in Fig. 6, this pusher mechanism is shown at the end of its inward movement, thus the plate 43 is beneath the discharge slot of the chute 42. At the beginning of the backward movement, the plate 43 passes from beneath the blank, which drops downwardly in vertical position in front of the vertical plate 44 and coming to rest in contact with the stationary guide rails 49, 49. In the succeeding stroke of the pusher mechanism, the blank is carried rearwardly in vertical position against the horizontal guide rails 49 and into a position to be advanced laterally or endwise toward the left. This advancement is accomplished by means of the reciprocating arm 58 and its spring finger 59 which engages the rear end margin of the blank at the instant the blank is pushed upon the guide rails and advances the blank laterally substantially through the distance equal to the length of the blank. Referring to Fig. 8, the blank is shown in the position it occupies after having been advanced by means of the pusher arm 58. In its advanced movement the blank is engaged by what are called spreader knives 66, which comprise two knife-like members or blades arranged in parallel relation along the upper and lower edges of the guide rails and furthermore so arranged that as the blank is advanced, these blades pass between the bottom wall A and the side walls C, C thereof. These knives or blades are adapted to oscillate through an angle of substantially 180 degrees, the upper knife being oscillated from a position in the plane of the blank outwardly and upwardly, whereas the lower knife oscillates from a similar position outwardly and downwardly. These knives are oscillated by means of horizontal and parallel shafts 67, 67 to which the knives are fixed and which extend laterally, terminating in bearings 68 located at the extreme end of the machine. Mounted on these shafts are gear sectors 69, 69 meshing with each other. On one of these shafts is mounted a pinion 70 which meshes with a rack bar 71 extending downwardly in the usual manner and having driving connection with a cam wheel 72 mounted on the driven shaft 5. These spreader knives or blades are adapted to act on each blank as it is advanced upon them to bend the side walls C, C outwardly and backwardly to the position shown in Fig. 9, and likewise in dotted lines, Fig. 10, the purpose being to break the several score lines c.

The blank having been operated on by the knives 66, 66, it is further advanced by the pusher arm 58 to a forward position and through a distance equal to the length of the blank upon a frame 73, consisting of horizontal and parallel rails 74, 74 spaced vertically apart a distance equal to the width of the blank between the side walls C, C, these rails 74, 74 acting to engage the side walls and retain them in extended position at right angles to the bottom wall A, as shown in Fig. 10. The rails 74, 74 are preferably supported on a vertical bar 75 preferably flexible to permit the removal of the frame 73 from the guide rails 49 in the event that the blank should become jammed for any reason. Associated with the frame 73 are stop members 76, 76, consisting of spring fingers so positioned with relation to the frame 73 as to insure the proper positioning of a blank thereon, said spring fingers merely acting to yieldingly engage the forward and rear edges as the blank is advanced upon the frame thereby determining the position of the blank.

Referring to Fig. 14, the foremost portion of the frame 73 is shown, together with the spring finger 76 engaging the forward edge of the blank. Immediately beyond the guide frame 73 is the mechanism known as an endless carrier, consisting of parts as follows: The carrier is shown in its entirety in Figs. 12 and 13, and comprises and endless sprocket chain 77 extending vertically and carried upon sprocket wheels 78 and 79, the upper sprocket wheel 78 being journaled upon a stub shaft 80 mounted at the upper end of a vertical standard 81, said standard preferably comprising a vertically adjustable plate 82 carrying the shaft 80, the purpose being to provide sufficient vertical adjustment to increase or decrease the tension in the sprocket chain. The lower sprocket wheel 79 is journaled in bearing blocks 83 mounted upon the foundation plate 4, there being a slot formed in the foundation plate to permit the sprocket wheel, its chain, and parts carried thereby to pass beneath said plate 4. The chain 77 comprises links 84 of the ordinary form and specially formed links 85 located between the successive links 84. These special links 85 are adapted to have secured thereto rectangular metal frames or arbors 86 projecting outwardly from the links to which they are secured. This mechanism, consisting of the endless chain and the plurality of arbors 86 carried thereby and spaced apart at equal distances, is known as a carrier. The chain is actuated or driven through the lower sprocket wheel 79 in a direction indicated by arrows in Fig. 13, and by mechanism clearly shown in Fig. 12. A shaft 87, upon which the sprocket wheel 79 is keyed, has loosely mounted thereon a segmental gear 88, said gear having its toothed portion meshing with a rack bar 89 extending downwardly and having driving engagement with a cam wheel 90 mounted on the shaft 5. Integral with the segmental gear 88 (Figs. 12 and 21) is an arm 91 to the end of which is journaled a spring pawl 92. In close proximity to the segmental gear and keyed to the shaft 87 is a ratchet wheel 93 having a plurality of square ratchet teeth formed about its periphery and adapted to be engaged by the pawl 92. The parts just described as constituting the driving mechanism of the carrier are so designed as to provide an intermittent motion, this being accomplished through the medium of the pawl and ratchet mechanism. This motion may be described as follows: As the rack 89 travels upwardly, the segmental gear 88 is rotated, carrying the pawl about the surface of the ratchet wheel without engaging the teeth thereof, hence the shaft 87 remains stationary. During the downward movement, however, the pawl engages one of the ratchet teeth and the ratchet wheel is revolved, thus rotating the shaft 87 and actuating the carrier through a distance sufficient to carry one of the arbors through a predetermined length of travel. In other words, the carrier is actuated with an intermittent stop motion, the arbors being moved through a predetermined distance, coming to rest during a predetermined position, and then advanced, and so on. Let it be understood from the foregoing that the endless chain carrier advances the several arbors 86 with the intermittent stop motion described, continuously in a circular path and traveling in a counter-clockwise direction, that is, in a downward direction on the forward side of the machine, and in an upward direction on the rear side of the machine. In order that the several links with their arbors attached may be held in relatively rigid positions during the travel of the arbors in their vertically downward movement, each arbor carrying link is provided with laterally extending journals on which are mounted guide rollers 94, 94 adapted to be retained within grooves formed in vertical guide rails 95, 95 mounted in the path of the endless chain 84. Thus the arbors are held substantially in rigid position during their downward movement.

In describing the function of the carrier and its arbors, together with those members associated therewith, the several positions of each arbor will be described separately. Referring first to Figs. 12 and 14, it is to be observed that the frame 73 consisting of the parallel rails 74 is located immediately to the right of and in horizontal alinement with one of the arbors, namely, the uppermost arbor which has assumed a vertical position and supported by means of its guide rollers between the vertical guide rails 95, 95. Considering that this arbor has been advanced to the position shown and comes to rest in that position, let it be assumed that a blank is supported upon the frame 73 in the position shown in Fig. 14. As clearly shown in the figures mentioned, a blank may be advanced from its position on the frame 73, onto the arbor. This is accomplished by a mechanism clearly shown in Fig. 14, which comprises parts as follows: The horizontal guide rod 57 (Figs. 1 and 15) terminates at its extreme end adjacent to the endless carrier mechanism, there being provided a bracket 96 secured to the main horizontal beam 50 which supports said bracket. Slidably mounted on this guide rod is a block 97 having an inwardly extending arm 98 to the end of which is secured a spring finger 99. The sliding block 97 is actuated with a reciprocating movement backwardly and forwardly along the guide rod 57 by means of a horizontal connecting bar 100 which serves to connect together all of the several pusher devices located along the path of movement of the blanks during their advancement from the feed hopper to the endless carrier, these several pusher devices being thereby mounted at fixed distances from each other and traveling through the same path of movement. The connecting bar 100 is fixed to the arm 55 (Fig. 1) which in turn is connected to the rack bar 52, which is reciprocated by means of the gear wheel 60, rack bar 64, and the cam wheel 65 carried upon the driven shaft 5. Referring further to the spring finger 99 of the pusher block 97, this member is arranged to travel from a point immediately adjacent to the arbor 86 to the opposite end of a blank mounted upon the frame 73. Upon its return stroke the pusher finger carries the blank endwise onto the arbor 86 so that its side walls engage the corresponding walls 86$^a$ of said arbor. Bearing in mind that the end walls B of the blank are extended outwardly in the plane of the bottom wall A thereof, mechanism is provided which automatically folds the end walls B inwardly against the corresponding end walls 86$^b$ of the arbor at the instant the said blank has been advanced onto the same. This mechanism is clearly shown in Fig. 14, and comprises a cam member 101 having the form of a relatively long bar fixed to the sliding block 97, and hence is moved with the said block 97 with reciprocating movement. One end of the cam member 101 extends laterally beyond the block 97 and is provided at its extreme end with an inclined cam surface 101$^a$. Similarly, adjacent to its point of connection with the block 97, it is provided with another cam surface 101$^b$ also inclined, though slightly rounded in contour. The cam surfaces 101$^a$ and 101$^b$ are adapted to engage two pivoted fingers 102, 102 mounted immediately in front of the arbor 86. These pivoted fingers 102, 102 are provided with hooked ends 102$^a$ extending inwardly toward the arbor 86. These fingers 102 normally occupy a position in which the hooked extremities 102$^a$ are withdrawn from contact with the arbor, being held in that position by means of springs 103. Immediately after a blank has been advanced onto the arbor, however, the cam member 101 comes in contact with upright pins 104, 104 carried by the fingers 102, thus swinging the hooked extremities thereof inwardly to engage the extended end walls B, B and folding them inwardly against the corresponding end walls 86$^a$, 86$^b$ of the arbor. In this manner the blank is completely folded around the arbor and is in readiness to be advanced by the arbor to the next position in which it is to be operated upon. In the meantime the blank 97 is carried in the opposite direction to the right in order to "pick up" the succeeding blank, and, inasmuch as the cam 101 is carried thereby the fingers 102, 102 are instantly released and spring outwardly out of the path of movement of the arbor. It is manifest that the same operations are repeated as each blank is advanced from the frame 73 onto each arbor as it is successively advanced to receiving position and brought to rest for a sufficient length of time to permit the blank to be applied thereto and the end walls folded in against the corresponding walls of the arbor.

Considering now the second position or stage of operation, let it be assumed that the same arbor above described with a blank applied thereto is moved downwardly to its next position of rest. Prior to its movement into the advanced position a plurality of strips of adhesive paper are drawn immediately in front of the arbor by an arrangement of parts which may be described as follows: Referring to Figs. 1, 16 and 17, in particular, the paper which forms the inner reinforcing strip and the outer covering layer of paper is supplied from rolls 105 mounted on a suitable spindle 106 forming a part of the feeding mechanism located at the left of the machine proper, as shown in Fig. 1. The roll supporting spindle is located adjacent to an open tank 107 adapted to contain a quantity of liquid adhesive, there being supported in said tank an applying roll 108 over which the strips are passed. By means of a suitable arrangement of guide pulleys 109, these strips are fed from their respective rolls horizontally into the machine from the left, as shown in Fig. 1. The uppermost strip 110 is comparatively narrow and is adapted to surround the box as a reinforcing strip, whereas the lower or under strip 111 is considerably wider and forms the covering layer of paper, although they are handled and applied as a single strip. These separate strips enter the end of the machine through guides 112 and 113 (Fig. 17.) having the same width as the strips and pass beneath a tension spring finger 114 and tension plate 115. The strips are advanced horizontally and to the right by means of reciprocating gripper mechanism comprising parts as follows, reference being had to Figs. 16, 17 and 30. Mounted in a vertical recess in the rear face of the beam 50 is a rack bar 116, to which is fixed the gripper comprising a body 117 extending upwardly, and having an arm 117$^a$ projecting over the upper surface of the beam 50 (Fig. 16). Carried by the body are two gripper jaws 118 and 119, the lower jaw 118 being fixed and the upper jaw being pivoted to the body 117. These jaws extend horizontally inward and receive between their ends the end of the strips 110 and 111, as shown. The upper jaw 119 is provided with an arm 119$^a$ which is connected to the body by means of toggle links 120 as shown in Fig. 30, there being contact pins 120ª extending transversely therefrom at their point of connection and serving a purpose hereinafter set forth. Also forming a part of the gripper is a cam finger 121 operatively connected with the toggle links 120 so that by raising the finger the jaws 118 and 119 will be closed in gripping position. This finger contacts with a cam rail 122 mounted on the top of the beam 50 having at its ends cam depressions 122ª and 122ᵇ located at the forward and rear ends of the path of movement of the gripper, respectively. The gripper and the rack bar 116 are actuated by means of a gear wheel 123 (Figs. 17 and 1) engaging teeth formed in the lower edge of the rack bar. This gear wheel is mounted upon a shaft 124 journaled in bearings 124ª and having a pinion 125 which meshes with a vertically reciprocating bar 126 extending downwardly and driven from the main shaft 5 by means of a cam wheel 127 of the usual design. As before suggested, the purpose of the gripper is to draw the reinforced strips of paper 110 and 111 immediately in front of and across the path of each arbor as it begins its downward movement, this operation being accomplished in the following manner and in coöperation with the following parts. Assuming the gripper to be at the beginning of a stroke, which at the left of travel, engages or grips at this point the end of the strips 110 and 111 between its jaws through the action of the cam depression 122ª, which permits the jaws to separate, this being effected by a spring 117ᵇ (Fig. 16) located between the jaws. The strip is then drawn forward and when the gripper reaches the end of its stroke the jaws are again separated by the cam action of the cam finger 121 and depression 122ᵇ. At this instant the arbor with the blank or box applied has come into contact with the strip and now in order that the strip can be applied to the box, it must be cut to the proper length. This is accomplished by means of a vertically reciprocating knife or blade 128 mounted at the forward end of the path of the gripper. This knife is fixed to a rocker arm 129, which is actuated intermittently by a link 130, connecting the arm 129 with the vertical rack bar 16 and cam wheel 19, hereinbefore described as typifying the driving mechanism employed. The operation of the cutting knife is so synchronized with the gripper mechanism and the travel of the carrier that the blade descends and cuts the strips at the instant the same are drawn out to the proper length. In addition to the cam rail 122 with its cam depressions for actuating the movable jaw 119 of the gripper, other mechanism is employed for insuring the positive action of the gripper, this mechanism comprising a rock shaft 131 (Fig. 16) located a short distance above and extending parallel with the cam rail 122, the ends of said rock shaft 131 being journaled in bearings 132 mounted upon the beam 50. Secured to the rock shaft and adjacent to the cam depressions 122ª and 122ᵇ are fingers 133—133. The rock shaft is rocked intermittently by means hereinafter described, so that at the end of each stroke of the gripper, the fingers 133 are rocked inwardly in contact with the pins 120ª carried by the links 120 of the gripper. The result is a more positive opening of the gripper jaws 118 and 119, thus avoiding the possibility of the paper strips being improperly engaged between the jaws of the gripper. The rock shaft 131 is actuated intermittently and by the following members. A rocker arm 134 is fixed at one end of the shaft, said arm being connected to a rearwardly disposed rocker arm 135 by means of a connecting link 136, said rocker arm 135 (as shown in Fig. 1) being mounted upon a horizontal shaft 137 journaled in bearings 138 secured to the table 4 of the machine. The shaft 137 is provided with a pinion (not shown) which meshes with a vertical rack bar 139 driven in the usual manner by a cam wheel 140 mounted upon the driven shaft 5.

Assuming now that the gripper has advanced a strip of the paper beneath the downwardly moving arbor with the box thereon, and the strip is cut by means of the knife 128, said arbor is then advanced and comes to rest in the second position of operation. In passing to its second position of operation the arbor passes between two vertically arranged brush wipers 141—141, in the manner shown in Fig. 20, these brush wipers being stationary and supported in a manner hereinafter pointed out. The function of these brush wipers is to seal the strip of paper against the end surfaces of the box as the latter is carried downwardly between them by the arbor. As before suggested, the arbor comes to rest in a position between the stationary brush wipers 141—141, as is shown in Fig. 12, and having come to rest, other parts of the machine operate upon the box, as will now be described. Referring to Figs. 12, 17, 18, 19 and 20, there are pairs of horizontal brush wipers 142, 143 mounted on either side of the arbor and immediately above and below the fixed brush wipers 141—141. These horizontal brush wipers consist of flat bars having their bristles extending from the opposed faces thereof, the upper pair of wipers 142 being mounted on sliding frames 144 comprising sleeves slidably mounted upon pairs of parallel and vertically spaced guide rails 145 mounted between the ends of horizontal U-shaped frame members 146 secured to laterally extending arms 147—147 integral with the vertical standard 81 supporting the endless carrier. It is here to be noted that the fixed brush wipers 141 are mounted at the ends of the frames 146. At the extreme ends of the uppermost horizontal brush wipers 142 are pivotally mounted wiper fingers 142ª—142ª, as shown in Figs. 12 and 18, these fingers projecting into the path of the arbors and acting to engage the blank as it passes downwardly between the fixed brush wipers 141—141. In a somewhat similar manner the lower pair of brush wipers 143—143 are fixed on sliding bars 148—148 mounted on the guide rails 145—145, and having integral sleeves 148ª—148ª surrounding the uppermost rails 145, which telescope within the surrounding sleeves of the frames 144—144 and terminate beyond the ends thereof in enlarged ends 148ᵇ—148ᵇ. Secured to the sliding bars 148—148 and spaced a short distance forwardly of the brush wipers 142 and 143 are T-shaped plate wipers 149—149, these plate wipers being vertically disposed with their forward edges slightly removed from the lower pair of brush wipers 143—143. These plate wipers are slightly flexible and are held in position by means of short leaf springs 150—150 bearing against the outer surfaces thereof. the function of the several wipers will be understood from the following: When the arbor comes to rest between the fixed brush wipers 141—141, the frame members 148—148 are positively actuated so that they move inwardly toward the arbor, thereby carrying the lower pair of brush wipers 143 in contact with the under side of the box, as shown in Fig. 18. Since the plate wipers 149—149 are mounted on the same sliding members 148—148, these wipers are carried forward and engage the margins of the outer covering strip of paper which project at right angles beyond the bottom wall A of the box thereby folding and sealing said marginal portion against the bottom surface of the box. The function of the horizontally movable brush wipers is obviously to seal the strips against the side wall of the box in the same manner that the fixed brush wipers 141 seal the strip against the end wall of the box. The upper pair of movable brush wipers 142—142 are moved forwardly in much the same manner as the under pair of brush wipers 142—142, although their forward movement is slightly delayed in order that the arbor may clear them before their movement is commenced. It is for this reason that the frame members 148—148 and 144—144 are separately mounted upon the guide rails 145—145, the latter being picked up and carried forward by the former after the same have advanced a short distance through the medium of telescoping sleeves 148ª—148ª, and the shoulder forming ends 148ᵇ—148ᵇ, which abut against the outer ends of the inclosed tubular portions of the frame members 144—144. The movement of the wipers having been defined, the mechanism for actuating them will now be described as consisting of parts as follows:

Two horizontal and substantially parallel links 151 and 152 extend just in front of the sliding supporting frames as shown in Fig. 17, the lower and longer link 151 being pivotally connected to the left hand sliding bar 148 at 153, whereas the shorter and upper link 152 being similarly connected at 154 to the right hand sliding bar 148. These links terminate to the right of the wiper mechanism and are pivotally connected at the ends of rocker arms 155—155 mounted upon a transverse rock shaft 156 which is operatively connected to a vertically arranged connecting rod 157 through the medium of a crank arm 158. The connecting rod 157 is pivotally connected to a vertically reciprocating bar 159 which is driven in the typical manner by means of a cam wheel 160 mounted upon the driven shaft 5.

It is to be understood that all of these parts are synchronized so that they operate and coöperate in the proper sequence and at the proper instant so that after the several brush and plate wipers have been advanced into contact with the box and then withdrawn into their normal positions, the paper strip has been sealed against the side and end walls of the box and the outwardly extending marginal portions along the ends of the box have been folded over and sealed against the bottom by means of the plate wipers 149—149.

It is to be observed, however, that the overlapping marginal portions of the paper strip extending along the sides; i. e., the upper and lower edges of the box have thus far not been operated upon. This particular step in the operation is accomplished by a separate and slightly different brush wiper which will now be described. As clearly shown in Fig. 19, the narrow marginal portion of the covering strip projects outwardly from the bottom wall A of the box. Extending horizontally throughout the length of the box and located a short distance forwardly of the lower pair of brush wipers 143—143 is an oscillating brush 161, so located that the ends of the bristles engage the bottom A of the box. The brush is mounted upon a horizontal shaft 162 journaled in bearings 163 mounted on the underside of the beam 50 beyond the ends of the brush, the shaft 162 extending beyond the right hand bearing and provided at its end with a pinion 164. A rock bar 165 engages the pinion 164 and extends vertically downward to the driven shaft 5 where it is operatively connected in the typical manner with a cam wheel 166. By means of the cam wheel a reciprocating movement is transmitted to the rack bar which in turn transmits a rocking or oscillating movement to the shaft 162 and the brush. The brush is so located and so actuated that as the arbor 86 with the box thereon commences its downward movement, upon the completion of the wiping operations, the oscillating brush wiper begins its relative movement in an upward direction; thus the relative movement of the brush and the box effects a wiping of the lower marginal portion of the strip against the bottom of the box. In a similar manner it wipes the upper marginal portion of the paper strip against the bottom of the box, this being accomplished, however, after the upward oscillating movement begins its downward movement. At this instant the arbor has carried the box downwardly to a point just in front of the oscillating brush, so that a downward wiping movement results, thus properly accomplishing the sealing of the uppermost marginal portion of the strip against the bottom surface of the box. In other words, the oscillating brush seals the lower marginal portion first with an upward wiping movement, and the upper marginal portion last with a downward wiping movement.

As thus far described, the blank has been folded into box form, applied to an arbor, carried downwardly thereby, a strip of adhesive paper applied around its sides and the surface of the paper sealed by means of fixed and movable brush wipers, and the overlapping edges of the paper wiped and sealed against the bottom of the box. These operations have been accomplished in a movement of the arbor through two positions and now the arbor is to be advanced to the third and last position; namely, immediately below the wiping mechanism. The arbor comes to rest in this third position, and the margins of the paper strip surrounding the open side of the box are cut preparatory to sealing the marginal portions or flaps against the inner surfaces thereof. The cutting mechanism comprises parts mounted in laterally projecting companion frames 167—167 located on opposite sides of the path of arbor, and adjacent the guide rails 95—95, Figs. 12 and 21. On each of the frames 167 are mounted pairs of cutter blades 168—168 spaced vertically apart at a predetermined distance. each pair being fixed to a vertical shaft 169 journaled in the frames. Fixed to the frames 167—167 are stationary cutting blades 170—170 corresponding to the movable cutting blades and coacting therewith, thus providing pairs of scissor-like cutting members arranged in alinement with the end marginal portions of the strip. As clearly shown in Fig. 22, these marginal portions are brought between the pairs of open cutters 168 and 170 by the movement of the arbor. The means for operating the cutters consists of parts as follows: Mounted upon the shafts 169—169 carrying the movable cutting blades 168 are pairs of cam fingers 171 and 172, one spaced just above the other. Movable transversely of the arbor and in the plane of the cam fingers is a pair of cam rods 173—173 having cam grooves 173$^a$ terminating in a shoulder 173$^b$ at the forward end, the cam finger 171 engaging said groove, and the other cam finger projecting into the path of the shoulder 173$^b$. The rear end of the cam rods 173 are fixed to a reciprocating frame or yoke 174 which straddles the carrier and terminates at its rear end in a slide rod 175 mounted in a tubular guide 176 mounted upon the table behind the carrier. Connected with the underside of the yoke 174 by means of a link 177 is a bell crank lever 178 (Fig. 13) journaled intermediate its ends upon a bearing bracket 179 secured to the frame member 2 of the machine. At the lower end of the lever 178 is provided a cam roller 180 which engages a cam groove or suitable contour formed in a cam wheel 180 mounted on the driven shaft 5 (Fig. 1). The actuating mechanism thus described is designed to move the yoke 174 and the cam rods 173—173 forwardly and rearwardly with a reciprocating motion. In Fig. 24 the parts are shown in the position at the beginning of a forward stroke and immediately after the arbor has come to rest with the box in the position shown in Fig. 22. Now, as the box comes to rest, the cam rods 173—173 are carried forward and the shoulders 173$^b$—173$^b$ at the forward ends engage the cam fingers 172—172 of the movable cutting blades, thereby effecting the closure of the same, so that the marginal portions of the strip are cut along transverse lines as at $f\!f$ (Fig. 25) forming flaps FF between them. In Fig. 23 the parts are shown in the position immediately after the cutting operation is completed, but, as will hereinafter be pointed out, the cam rods 173—173 continue their forward movement, passing into the arbor 86 and engaging the bottom wall of the box. The result is that the box is pushed forwardly from the arbor and comes to rest between a horizontal track or guide rails 186 and 187 immediately in front of the arbor 86, Fig. 13. Having pushed the box from the arbor and after the cutting operation has been completed, the cam rods 173—173 are carried rearwardly to their normal position and during this movement the actuating fingers 171—171 are engaged by the shoulders 173$^b$—173$^b$ of said rods, thereby restoring the movable blades 168 to their normal position (Fig. 24) and in readiness for receiving and operating the next box carried upon the following arbor.

Upon being removed from the arbor the box with the paper covering applied thereto has the appearance as shown in Fig. 25, that is, with the marginal portions of the covering strip 111 extending outwardly from the walls of the box and the flaps FF formed in end portions thereof. It is to be noted that the cuts ff are substantially in alinement with the inside edges of the box at the junction of the side walls C and end walls B.

The operation next to be accomplished is, first, the folding inwardly against the inner surface of the end flaps FF, and secondly, the folding in and sealing of the remaining marginal portions indicated in Fig. 25 as GG over the edges of the side walls C and against the inner surfaces thereof. Referring now to these operations, it is to be noted that the box has been removed or pushed forwardly from the arbor and between the horizontal rails 186 and 187 which extend to the left for a distance of at least twice the length of the box, as shown in Fig. 26, the lower rail 186 being provided with a marginal guide flange 186ᵃ. The box being now upon the track, the first operation is to transpose the same laterally and in a direction to the left, as indicated by the arrow in Fig. 24. The movement of the box is accomplished by means of a transverse arm 188 which normally occupies the position shown in Fig. 23 near the right hand end and between the guide rails. At the instant the box is placed on the track, the arm 188 is actuated in a direction to the left into contact with the box, pushing the same laterally throughout a distance substantially equal to the length of the box. The arm 188 is acutated by mechanism arranged as follows:

As shown in Fig. 21, a guide rod 190 is mounted in brackets 191—191 immediately in front of the guide rails 186 and 187. Slidably mounted on the guide rod 190 is a sleeve 192 to which is fixed the arm 188. A link 193 is pivotally connected to the sleeve 192 and extends horizontally and to the right, being pivotally connected at its opposite end with a crank arm 194 (Fig. 1) journaled in a bearing 195 mounted upon the table 4, substantially midway between the ends of the machine. Associated with the crank arm 194 is a crank shaft 196 which carries a pinion (not shown) which meshes with a rack bar 197 extending downwardly through the table 4 and driven by a cam wheel 198 mounted upon the driven shaft 5. This arrangement of actuating mechanism drives the sleeve 192 and the arm 188 backwardly and forwardly on the guide rod 190 with a reciprocating motion, this movement being so timed that at each stroke a box is advanced laterally and to the left.

Carried on the inner end of the arm 188 is a wiper plate 199 which extends at right angles to the arm and toward the box. As clearly shown in Fig. 24, as the arm engages the end of the box, the wiper plate passes over the edge thereof, folding the adjacent or rearmost flap F inwardly and at right angles to the end wall. At the opposite end of the box is mounted a fixed wiper plate 200 which lies just inwardly from the path of the box and in a position to engage the foremost flap F as the box passes the same in its lateral movement, thereby folding said flap inwardly and over the edge of the box, as clearly shown in Fig. 24.

The arm 198 advances the box laterally along the track 188 to a position immediately to the left of the carrier, where it comes to rest opposite mechanism operative to complete the folding and sealing of the covering sheet in the following manner: As shown in Fig. 27, the box is positioned immediately opposite a T-shaped member 201 forming one unit or part of the mechanism shown in Figs. 30, 31 and 32, comprising a reciprocating sleeve 202 mounted in bearings 203—203 fixed to the table 4 of the machine, and arranged transversely thereof. At the forward end of the sleeve 203 is slidably inclosed a rod 204 which supports the cross bar 205 of the T-shaped member 201, said bar 205 having at its ends transverse plates 206 forming slots opening outwardly toward the box. Arranged parallel to the plates 206 are yieldable plates 207—207 mounted on rods 208—208 slidably mounted within longitudinally extending bores formed at the ends of the cross bar 205. Mounted within the bores and engaging the ends of the rods 208—208, are springs 209. The springs 209 act to force the movable plates outwardly toward the end plates 206—206, these plates forming jaws which open toward and are in alinement with the end walls B of the box. As clearly shown in Figs. 27 and 28, the cross bar 205 is adapted to be advanced a short distance toward and into the interior of the box as it rests upon the rail 188, the same being actuated inwardly and outwardly by mechanism to be hereinafter described and acting to fold inwardly and seal the flaps FF of the covering strip inwardly and against the end walls B of the box by the passage of the same between the plates 206 and 207 accompanied by the inward folding and sealing of said flaps against the inner surface of the end walls, as shown in Fig. 28. The operation accomplished by the parts just described is clearly shown in Fig. 29 illustrating a box immediately after the first folding operation is completed, and it will be understood that the remaining parts act to fold and seal in a somewhat similar manner, the side margins or flaps GG. Mounted upon the tubular sleeve 203 is a collar or enlarged portion 210 which travels therewith forwardly and rearwardly through a predetermined distance and with an intermittently reciprocating movement, said collar and sleeve being actuated by means of the bell crank lever 26 and an intermediate link 27 connected to said collar. The lever 26 is actuated by means of the cam plate 19 hereinbefore described, as setting forth the common means employed for actuating the several parts of the machine. Pivotally mounted intermediate the ends upon fixed journals 211—211 mounted upon a vertical supporting standard 212 (Fig. 30) is a pair of lever arms 213—213 located above and below the block and in vertically disposed relation to each other. At the forward ends of these lever arms are provided inwardly extending fingers 214—214 with rounded extremities. At the rear ends of the lever arms are cam rollers 215—215 which engage cam surfaces formed on the upper and lower sides of a cam plate 216 mounted upon the tubular sleeve 203 immediately to the rear of the collar 210. Extending between the forwardly projecting portions of the lever arms 213 is a coil compression spring 217 acting to force the forward ends of the arms apart as will hereinafter appear.

Pivotally mounted on the collar 210 is a pair of levers 218—218 extending forwardly and parallel with the sleeve 203, and having at their forward ends outwardly projecting brushes 219—219. These levers are pivotally mounted a short distance from their rear ends and extending between their rear extremities are two toggle links 220—220. Also, adjacent their rear ends are tension devices consisting of coil springs 221—221 mounted on screws 222—222, extending through openings in the levers and anchored in the collar 210.

Referring now to the manner in which this mechanism operates, it will be understood that the parts are withdrawn from the path of the box during its movement into position to be operated upon, and occupy the position shown in Fig. 31. At the first part of movement of the sleeve 203, the cross-bar 205 is carried forward and folds and seals the end flaps FF as already described. Simultaneously, the collar 210 and cam plate 216 are carried forward, the lever arms 213—213 being first operated by engagement with the cam surfaces of said plate, so as to throw the flanges 214—214 at the forward ends inwardly and toward each other, as clearly indicated by the dotted lines in Fig. 31. At the instant this is completed, the brush levers 218—218 are carried forward and enter the box, and in so doing fold the flaps GG inwardly as shown in Fig. 32. Having entered the box, the brushes are forced outwardly so as to exert sufficient pressure upon the flaps to seal them against the surface of the box, this being accomplished by means of the toggle links 220 at the rear end of the levers and a fixed finger 223 mounted upon the forward bearing 203. This finger is so placed that it strikes the pivotal connection between the link, flexing them to a straight line position as shown in Fig. 32, the same being locked by the provision of an extension 220ª on the lower toggle link which engages the upper end portion of the other link, as shown.

These operations having been completed, the entire folding and sealing members are withdrawn together by the rearward sliding of the sleeve 203, and come to rest awaiting the next operation. Moreover during its rearward movement the toggle links are engaged by a finger 224, similar to the finger 223, and mounted on the rear bearing 203, Fig. 30, this finger acting to "break" the links, thereby contracting the forward brush ends of the levers.

The operations on the box have now been completed and there now remains only the discharging of the same from the machine. This is accomplished in the manner and by parts operating as follows:

Immediately beyond the mechanism just described is provided a forwardly extending track 225 (Fig. 26) which joins the longitudinally extending track 188 at its forward end. The transverse or discharge track has a width equal to the length of a box. In alinement with the track 225 is a reciprocating pusher plate 226 mounted at the end of a slide rod 227 mounted in guides 228, fixed to the machine frame, the rod being operatively connected to the reciprocating sleeve 203 of the sealing mechanism by means of an arm 229. As the boxes are advanced one after another to the sealing mechanism, they are forced or pushed onward by the boxes which follow; thus when each box is completed it rests upon the track 188 and opposite the discharge track 225. The pusher plate as it moves forward carries each box forwardly on the track, from which they are removed by hand as they accumulate.

In describing the operation of the machine, a single box was purposely considered and its progress through the many operations followed. Manifestly, it is understood, and as frequently indicated, a number of boxes are continuously passing through the machine, and operated upon successively, all of the different operations being accurately timed so that the progress of the boxes is uniformly regular and uninterrupted. Furthermore, the machine may be operated at various speeds and its capacity or output varied accordingly.

Although a machine complete in all its details and requisites complement of operative parts or units has been described and illustrated, it is manifest that the mode of operation, the structure of the mechanism and the arrangement of the parts may be variously modified or re-arranged without departing from the spirit of the invention. Therefore, I do not wish to be limited to the precise embodiment of the invention herein described, except in so far as it is specifically pointed out in the appended claims.

I claim as my invention:

1. In a machine of the character described, the combination of an arbor adapted to be advanced into successive positions, means for applying a folded blank to said arbor in one position thereof, means for feeding a sheet of covering paper into the path of said arbor, and means for applying said sheet to said blank in the movement of said arbor from one to another of said positions.

2. In a machine of the character described, the combination of an arbor, means for folding and applying a blank to said arbor, means for advancing said arbor from blank applying position, means for feeding a sheet of covering paper into the path of said arbor, and wiping members for applying said sheet to the surface of said blank during the advancement of said arbor.

3. In a machine of the character described, the combination of an arbor, means for folding and applying a blank upon said arbor, means acting to advance said arbor from blank applying position, means for feeding a strip of covering paper into the path of said arbor, and fixed wipers for applying said strip to the outer surface of said folded blank in the movement of said arbor.

4. In a machine of the character described, the combination of an arbor, means for folding a blank into box form, means for advancing said folded blank and applying the same to said arbor, mechanism for advancing said arbor from blank receiving position, means for feeding a strip of covering paper into the path of said arbor, and wiping members in the path of said arbor for applying said strip to the outer surface of the folded blank.

5. In a machine of the character described, the combination of a plurality of arbors, mechanism for advancing said arbors consecutively, means for folding and advancing successive blanks toward and applying the same to said arbors, means for applying covering strips of adhesive paper to the outer surfaces of said blanks in the advancement of said arbors from blank receiving position, and means for successively removing the covered blanks from said arbors.

6. In a machine of the character described, the combination of an arbor adapted to be advanced into successive positions, means for applying a folded blank upon said arbor in one position of advancement, means for feeding a strip of adhesive paper in position to engage the outer surface of said blank, means for folding and wiping the extended margins of said strip against the bottom wall of the folded blank during the advancement of said arbor from blank applying position, means for removing the blank from the arbor and advancing the same from the path thereof, and means for turning a marginal portion of the strip inwardly into contact with the inside surface of a wall of the folded blank.

7. In a machine of the character described, the combination of blank feeding mechanism comprising a hopper and a track, means for feeding successive blanks from said hopper onto said track, and along the latter, members acting to bend the blank along predetermined score lines, forming members for retaining said blank in box form, an arbor movable in a path adjacent the discharge end of said track, means for advancing said blank from said track onto said arbor, and means for successively applying a strip of covering paper to said blanks in the advancement of said arbor from blank receiving position.

8. In a machine of the character described, the combination of an arbor adapted to support a blank in folded form, means for successively feeding blanks upon said arbor, comprising a feed hopper, a track extending from said hopper toward said arbor, oscillating members mounted along said track for engaging the walls of said blank, and bending the same along predetermined score lines, and means for advancing said blanks along said track and applying the same in folded form onto said arbor.

9. In a machine of the character described, the combination of an arbor, actuating means for said arbor, means for applying a folded blank to said arbor, means for feeding a strip of adhesive paper in the path of movement of said arbor, said blank being advanced by said form into contact with said strip and between wiping members, acting to apply the strip to the sides of said blank.

10. In a machine of the character described, the combination of an arbor, actuating means for said arbor, means for applying a folded blank to said arbor, means for feeding a strip of adhesive paper in the path of movement of said arbor, said blank being advanced by said arbor into contact with said strip, and wiping members positioned transversely to the path of said arbor, and acting to apply the strip to the forward and rear sides of said blank.

11. In a machine of the character described, the combination of an arbor, actuating means for advancing said arbor into a plurality of positions, means for applying a folded blank to said arbor in one position of advancement, means for feeding a strip of adhesive paper into the path of said arbor, said strip being applied to the sides of said blank during the movement of said arbor into an advanced position, and members acting to wipe the contacting and overlapping portions of said strip against the surfaces of the blank in the advanced position thereof.

12. In a machine of the character described, the combination of an arbor, actuating means for advancing said arbor into a plurality of positions, means for applying a folded blank to said arbor in one position of advancement, means for feeding a strip of adhesive paper into the path of said arbor, and members acting to wipe the contacting and overlapping portions of said strip against the surface of the blank in the movement of said arbor into an advanced position.

13. In a machine of the character described, the combination of an arbor, actuating means for intermittently advancing said arbor into a plurality of positions, means for applying a folded blank to said form in one position, means acting simultaneously to feed a strip of adhesive paper in advance of said arbor, said strip being carried with said blank into an advanced position, and wipers actuated to seal the contacting portions of said strip and blank, and to fold over and seal the overlapping margins of the strip against a transverse surface of said blank.

14. In a machine of the character described, the combination of an arbor, actuating means for intermittently advancing said form into a plurality of positions, means for applying a folded blank to said form in one position, means for feeding a strip of adhesive paper in advance of said form, said strip being carried with said blank into an advanced position, and wipers adapted to seal the contacting portions of said strip and blank, and to fold over and seal the margins of the strip against a bottom wall of said blank.

15. In a machine of the character described, the combination of an endless carrier having a plurality of arbors, means for applying blanks successively to said arbors, means for advancing said arbors into a plurality of positions, means for successively feeding strips of adhesive paper in the path of each arbor prior to the advancement thereof, reciprocating members acting to wipe said strip on the outer sides of the blank in one position of advancement, means for removing each blank from its arbor, and means acting to fold the margins of said strip over edges of said side walls and down against the inside thereof.

16. In a machine of the character described, the combination of an endless carrier having a plurality of arbors, means for applying blanks successively to said arbors, means for advancing said arbors, means for successively feeding strips of adhesive paper in the path of each arbor prior to the advancement thereof, brush members acting to wipe said strip on the outer sides of the blank in one position of advancement, means for removing each blank from its arbor, and members operative in the removed position of said blank to fold the margins of said strip over the edges and down against the inside surface of the side walls of said blank.

17. In a machine of the character described, the combination of an arbor adapted to be advanced into successive positions, means for applying a box upon said arbor in one position thereof, means for feeding a strip of covering paper in advance of said arbor in its blank applying position, said strip being applied to said blank in the movement of said arbor to an advanced position thereof, and a plurality of relatively movable wipers operative in said advanced position of the arbor to wipe the outer surfaces of said blank.

18. In a machine of the character described, the combination of an arbor adapted to be successively advanced into a plurality of positions, means for applying a folded blank to said arbor, and in one position thereof, means for feeding a strip of covering paper into the path of said arbor, a series of wipers operating in the movement of said arbor from blank applying position to apply said strip to the side and bottom walls of said blank, means for removing said blank from said arbor, and another series of wipers operating to fold and apply the extended margins of said strip to the inner surface of the side walls of said blank.

19. In a machine of the character described, the combination of feeding means for advancing blanks successively from a source of supply, oscillating members operative to engage and bend the end and side walls of each blank along their score lines, an arbor located in the path of said blank, means for advancing said blank into engagement with said arbor, means for folding the walls of said blank against said arbor, and means for applying a covering layer of paper to said folded blank.

20. In a machine of the character described, the combination of feeding means for advancing blanks successively from a source of supply, a track along which said blanks are advanced, rails located along said track for retaining the one pair of walls in extended position, an arbor located in the path of said blank, means for advancing said blank from said rails to said arbor, means for folding the other pair of walls of said blank against said arbor, and means for applying a covering layer of paper to said folded blank.

21. In a machine of the character described, the combination of a hopper adapted to contain a supply of blanks and comprising a reciprocating bottom plate adapted to engage and advance each blank, means for bending the walls of each blank arranged along the path of said blanks, and comprising members engaging said walls, means for advancing said blank beyond said bending members, an arbor located in the path of said blank adapted to receive said blank in folded form, and means for applying a coating of paper to said folded blank.

22. In a machine of the character described, the combination of a feed hopper adapted to contain a supply of blanks in knockdown form, a reciprocating member for advancing said blanks from said hopper, means operative to bend the end walls of each blank, means for advancing said blank endwise, spreader knives in the path of said blank adapted to pass between the side walls and bottom wall of the blank and operative to bend said side walls outwardly, means for advancing said blank beyond said knives, an arbor located in the path of said blank adapted to receive said blank in folded form, and means for applying a coating of paper to said folded blank.

23. In a machine of the character described, the combination of a track, means for advancing a blank along said track, members located along said track operative to engage and bend the walls of said blank along their score lines, an arbor located at the end of said track, means for advancing the blank upon said arbor, and means for applying a covering of paper to said folded blank.

24. In a machine of the character described, the combination of a track, means for advancing a box blank along said track, members located along said track adapted to engage and retain the walls of said blank in folded position, an arbor located at the end of said track, means for advancing said blank upon said arbor, and means for applying a covering of paper to said folded blanks.

25. In a machine of the character described, the combination of an arbor adapted to be advanced into successive positions, means for feeding a formed blank onto said arbor, and in one position of advancement thereof, a reciprocating gripper movable transversely in the path of said arbor and adapted to draw a strip of paper into the path of said arbor, tripping devices at each end of the path of movement of said gripper for effecting the engaging and releasing of said strip by said gripper, and means for applying said paper to the surface of the blank.

26. In a machine of the character described, the combination of a carrier, a plurality of arbors mounted on said carrier, means for feeding formed blanks successively to said arbors, a reciprocating gripper movable transversely in the path of said arbors and adapted to draw a strip of paper immediately in front of each arbor in its blank receiving position, tripping devices at each end of the path of movement of said gripper for effecting the engaging and releasing of the strip by said gripper, and a cutter for cutting the strip to a predetermined length, and means for applying said paper to the surfaces of the blank.

27. In a machine of the character described, the combination of a carrier, an arbor mounted on said carrier, means for applying a blank in folded form to said arbor, means for feeding a strip of adhesive paper in the path of said arbor, brushes acting to apply the paper to the sides of said blank, wipers carried by said brushes acting to fold the end margins of said strip against the bottom wall of the blank, and an oscillating brush positioned adjacent the path of the bottom wall of the blank and adapted to alternately wipe the side margins of the strip against the bottom wall in the relative movement of said arbor and brush.

28. In a machine of the character described, the combination of a carrier, means for applying blanks in folded form to said carrier, means for feeding a strip of adhesive paper in the path of said arbor, brushes acting to apply the paper to the sides of said blank, reciprocating wipers acting to fold the end margins of said strip against the bottom wall of the blank, and an oscillating wiper positioned adjacent the path of the bottom wall of the blank and adapted to alternately wipe the side margins of the strip against said bottom wall in the advance movement of said arbor.

29. In a machine of the character described, the combination of means for advancing a blank folded in box form, means for applying a covering of paper to the outer surface of said box, said covering extending beyond the edges of the walls of the box, cutting members acting to cut the extending portions of the paper transversely adjacent the corners of the box and wiping members acting to fold opposed sides of the paper inwardly over the edges of the walls of the box.

30. In a machine of the character described, the combination of means for advancing a blank folded in box form, means for applying a covering of paper to the outer surface of said box, said covering extending beyond the edges of the walls of the box, cutting members acting to cut the extending portions of the paper transversely adjacent the corners of the box, wiping members acting in the relative movement of the box thereto to successively fold opposed sides of the paper inwardly over the edges of the walls of the box, and means for sealing the paper against the inner surface of the walls of the box.

31. In a machine of the character described, the combination of means for folding a blank in box form, means for applying a covering of paper to the outer surface of said box, the margins of said covering extending beyond the edges of the walls thereof, cutters acting to cut the extended margins of the paper at the corners of the box, and wiping members operative to fold said margins of the paper over the edges of the box walls, and into contact with the inner surface thereof.

32. In a machine of the character described, the combination of means for advancing a blank folded in box form, means for applying a covering of paper to the outer surface of said box, the margins of said covering extending beyond the edges of the walls thereof, fixed wiping members mounted in the path of movement of said folded blank, and operative to fold one pair of opposed margins of the paper inwardly over the edges of the box walls, and movable sealing members acting to engage the inner surface of the box walls, thereby sealing the paper thereto when said blank has come to rest in an advanced position.

33. In a machine of the character described, the combination of means for forming a blank into box form, a carrier for supporting the box, means acting in the movement of said carrier to apply a covering of adhesive paper to the box, said covering having a marginal portion extending beyond the edges of the box walls, pushers operative to remove said box from the carrier, means for advancing and supporting said box, wiper plates adjacent the path of said box acting to fold the marginal portions of said paper inwardly and over the edges of the box, and jaw members adapted to grip the walls of said box, to seal the paper against the inner surface thereof.

34. In a machine of the character described, the combination of means for forming a blank into box form, a carrier for supporting the box, means acting in the movement of said carrier to apply a covering of paper to the box, said covering having a marginal portion extending beyond the edges of the box walls, pushers operative to remove said box from the carrier, means for supporting and advancing the removed box, plates positioned adjacent the path of said box acting to fold the marginal portions of said paper inwardly over the edges of the box, and mechanism operative to alternately engage the opposed inner wall surfaces, and seal the paper thereagainst, and mechanism for discharging the box.

35. In a machine of the character described, the combination of means for forming a blank into box form, a carrier for supporting the box, means acting in the movement of said carrier to apply and seal a covering of paper to the outer wall surfaces of the box, said covering having a marginal portion extending beyond the edges of the box walls, a track located adjacent the path of movement of said carrier, means for removing said box from the carrier onto said track, means for advancing the box along the track, plates arranged along said track and acting in the movement of the box to fold the forward and rear margins inwardly over the edges of the box walls, and brush members operative to enter the inside of said box to seal the margins of the paper against the inner wall surfaces, and to be removed therefrom.

36. In a machine of the character described, the combination of means for forming a blank into box form, a carrier for supporting the box, means acting in the movement of said carrier to apply a covering of paper to the box, said covering having a marginal portion extending beyond the edges of the box walls, a track located adjacent the path of movement of said carrier, means for removing said box from the carrier onto said track, means for advancing the box along the track, stationary members acting in the movement of the box to fold the margins of the paper inwardly over the edges of the walls of the box, and reciprocating mechanism operative in different positions of said box to enter the inside thereof to seal the paper against opposed wall surfaces, and to be removed therefrom.

37. In a machine of the character described, the combination of a carrier, means for feeding blanks in folded form upon said carrier, means for applying a covering of adhesive paper to the folded blank, a track extending transversely to the path of movement of said carrier, means for discharging the box from said carrier onto said track, means for advancing said box along said track to a position of rest, separable jaw members movable toward and from said box, and adapted to fold the projecting margins of the paper inwardly and seal them against the inner surfaces of the box walls, and automatically operative means for removing said jaw members from contact with the walls, prior to the removal thereof from the box.

38. In a machine of the character described, the combination of an arbor, means for applying a folded blank in folded form upon said arbor, means for applying a covering of adhesive paper to said folded blank, said covering having marginal portions extending beyond the edges of said blank, means for discharging the box from said carrier, means for advancing said box to a position of rest, and means for folding and sealing the marginal portions of said covering against the inner surface of the blank, comprising separable jaw members, brushes mounted on said jaw members, a reciprocating arm carrying said jaw members, and cam members coöperating with said jaw members for automatically separating said jaw members prior to the removal thereof from the box.

39. In a machine of the character described, the combination of means for forming a blank into box form, a track, means for advancing a blank along said track, means acting in the movement of said blank along said track to fold the walls thereof into box form, a vertically movable carrier at one end of the track, arbors mounted on said carrier and adapted to be brought successively into registering relation with said track and to have a blank applied thereto, means acting in the vertical movement of each arbor to apply a covering of paper to the outside of the box, there being a marginal portion extending beyond the edges of the box walls, a horizontal track offset vertically from said first mentioned track, means for discharging the boxes from said arbors onto said track, means for advancing the box along said last mentioned track, and means acting in the several positions of advancement along said track to fold and seal the marginal portions of the paper against the inner surface of the box walls.

40. In a machine of the character described, the combination of means for forming blanks into box form, a carrier for supporting the boxes, means acting in the movement of said carrier to apply a covering of paper to each box, said covering having a marginal portion extending beyond the edges of the box walls, a horizontal track offset from the path of said carrier, means for discharging the boxes from said carrier onto said track, means for advancing the boxes along said track, and means acting in the several positions of advancement along said track to fold and seal the marginal portions of the paper against the inner surface of the box walls.

In witness whereof, I hereunto subscribe my name this 2nd day of August, A. D. 1920.

HERBERT J. SAUVAGE.